US011087029B1

(12) United States Patent
Satpathy

(10) Patent No.: US 11,087,029 B1
(45) Date of Patent: Aug. 10, 2021

(54) ENCRYPTION ENGINE AND DECRYPTION ENGINE WITH GLITCH RANDOMIZATION TO PREVENT SIDE CHANNEL ATTACKS

(71) Applicant: Facebook Technologies, LLC, Menlo Park, CA (US)

(72) Inventor: Sudhir Satpathy, Redmond, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 117 days.

(21) Appl. No.: 16/597,591

(22) Filed: Oct. 9, 2019

(51) Int. Cl.
*G06F 21/75* (2013.01)
*H04L 9/06* (2006.01)
*G06N 3/00* (2006.01)

(52) U.S. Cl.
CPC .............. *G06F 21/75* (2013.01); *G06N 3/006* (2013.01); *H04L 9/0668* (2013.01)

(58) Field of Classification Search
CPC ........ G06F 21/75; G06N 3/006; H04L 9/0668
USPC .......................................................... 380/43
See application file for complete search history.

(56) References Cited

U.S. PATENT DOCUMENTS

| | | | |
|---|---|---|---|
| 10,747,700 B1* | 8/2020 | Sarusi ................. | G06F 13/4045 |
| 2003/0223580 A1 | 12/2003 | Snell | |
| 2007/0071236 A1 | 3/2007 | Kohnen | |
| 2009/0168999 A1 | 7/2009 | Boswell et al. | |
| 2010/0150350 A1* | 6/2010 | Reidenbach .......... | H04L 9/0631 |
| | | | 380/277 |
| 2010/0153747 A1 | 6/2010 | Asnaashari et al. | |
| 2014/0074719 A1* | 3/2014 | Gressel .............. | G06Q 20/3827 |
| | | | 705/64 |
| 2014/0351896 A1 | 11/2014 | Koo | |

(Continued)

FOREIGN PATENT DOCUMENTS

| | | | |
|---|---|---|---|
| CN | 108282494 A | * | 7/2018 |
| EP | 2793155 A1 | | 10/2014 |
| WO | 2017/052980 A1 | | 3/2017 |

OTHER PUBLICATIONS

Moradi et al., "Glitch-Free Implementation of Masking in Modern FPGAs," 2012 IEEE International Symposium on Hardware-Oriented Security and Trust, Jun. 3-4, 2012, pp. 89-95.

(Continued)

*Primary Examiner* — Peter C Shaw
(74) *Attorney, Agent, or Firm* — Shumaker & Sieffert, P.A

(57) ABSTRACT

A decryption integrated circuit (IC) includes an interface configured to receive an encrypted block of data and a decryption datapath. The decryption datapath has a plurality of computational stages arranged in a pipeline configured to decrypt the encrypted block of data to form a decrypted block of data. A non-linear computational stage included in the pipeline of the decryption datapath includes multiple asymmetric logical paths and multiple bypassable latches. A first signal traverses a first logical path and a second signal traverses a second logical path having a greater number of logical units than the first logical path. Each bypassable latch is positioned in a respective logical path of the multiple asymmetric logical paths. The decryption IC further includes a controller configured to assign an individual random bit sequence to each bypassable latch to randomly activate or randomly disable each bypassable latch of the multiple bypassable latches.

26 Claims, 16 Drawing Sheets

(56) References Cited

U.S. PATENT DOCUMENTS

| | | | |
|---|---|---|---|
| 2015/0161401 A1* | 6/2015 | Na | G06F 21/606 |
| | | | 713/189 |
| 2015/0222421 A1 | 8/2015 | Guo et al. | |
| 2016/0203342 A1 | 7/2016 | Matsuo | |
| 2017/0092157 A1 | 3/2017 | Christiansen et al. | |
| 2017/0315608 A1* | 11/2017 | Shanware | G06F 3/0346 |

OTHER PUBLICATIONS

Kenney, "Energy Efficiency Analysis and Implementation of AES on an FPGA", A thesis presented to the University of Waterloo in fulfillment of the thesis requirement for the degree of Master of Applied Science in Electrical and Computer Engineering, Jan. 1, 2008, 84 pp.

"Announcing the Advanced Encryption Standard (AES)," Federal Information Processing Standards Publication 197, Nov. 26, 2001, 51 pp.

Rouse, "Block Cipher," accessed from https://searchsecurity.techtarget.com/definition/block-cipher, last updated Jan. 4, 2006, 1 pp.

U.S. Appl. No. 16/506,618, filed Jul. 9, 2019, by Atlas et al.
U.S. Appl. No. 16/446,140, filed Jun. 19, 2019, by Satpathy.
U.S. Appl. No. 16/446,187, filed Jun. 19, 2019, by Satpathy.
U.S. Appl. No. 16/446,209, filed Jun. 19, 2019, by Satpathy.

* cited by examiner

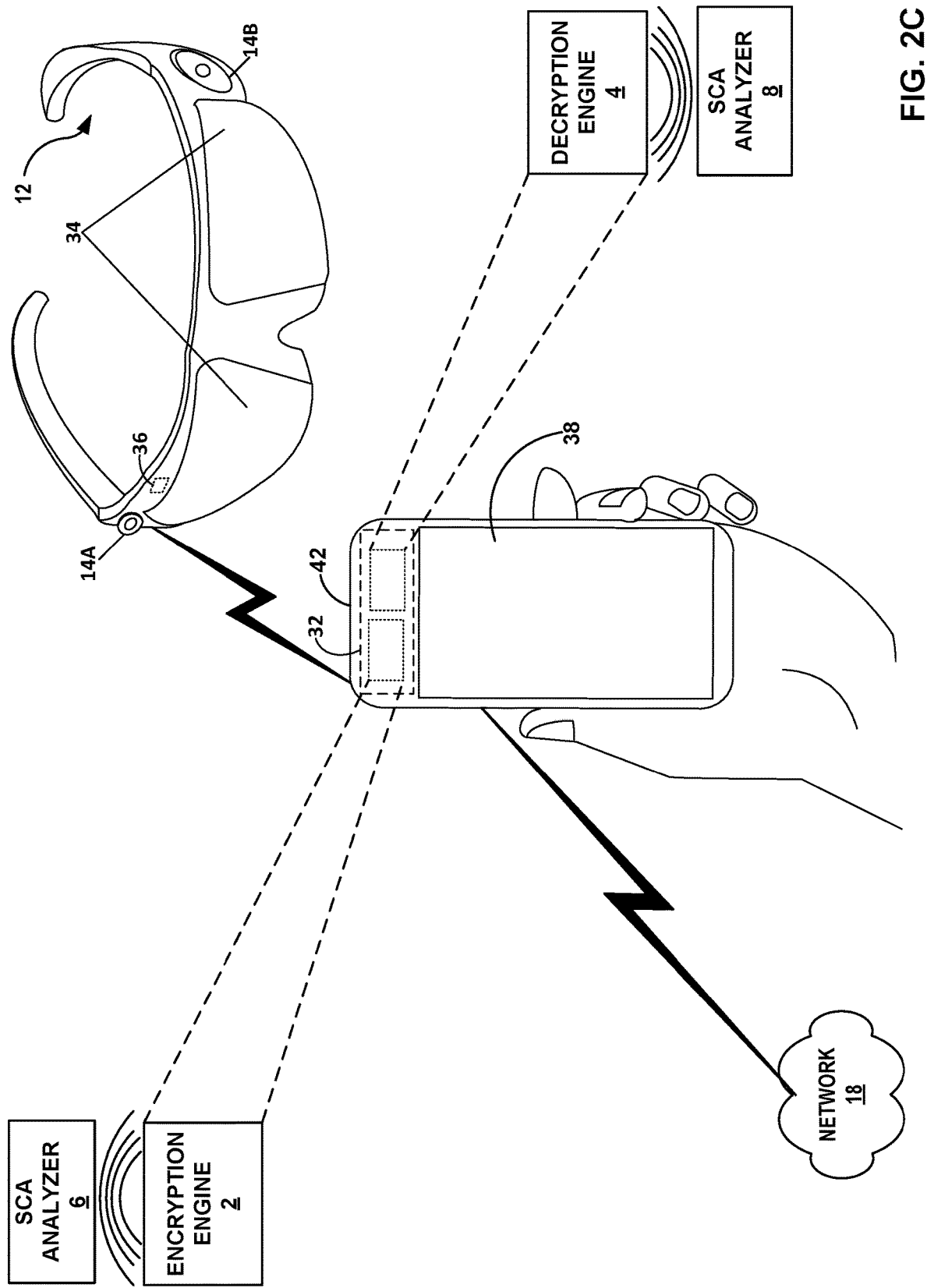

ENCRYPTION ENGINE AND DECRYPTION ENGINE WITH GLITCH RANDOMIZATION TO PREVENT SIDE CHANNEL ATTACKS

TECHNICAL FIELD

This disclosure generally relates to data encryption and decryption implemented in various types of computing systems.

BACKGROUND

Many computing systems, including those that receive content over networks, incorporate content protection or digital rights management technology that includes data encryption and decryption hardware and software. This encryption protects secure data, which is potentially sensitive, private, and/or right-managed and is stored or used on the system, from unauthorized access and exploitation.

SUMMARY

In general, this disclosure describes encryption engines and decryption engines that implement glitch randomization. The encryption engines and decryption engines of this disclosure include bypassable latches in non-linear computational stages of pipelined datapaths. Configurations of this disclosure cause a trio of latches to function synergistically within a given unit of the non-linear computational stage. Each latch of a given trio is either activated or bypassed based on a random number sequence, thereby inserting or suppressing signal path asymmetry (or diversity) on a random basis. Depending on the random pairing of statuses assigned to each latch of a given pairing of latches within the latch trio, the inserted glitches may also introduce different magnitudes of signal path diversity, thereby causing varying amounts of downstream switching to resynchronize signal pairs that provide operand pairs to respective combinatorial logic gates. The encryption and decryption engines of this disclosure randomize the activation or bypassing on a latch-by-latch basis, thereby inserting glitches of random magnitude, in random order, across parallel units of the non-linear computational stage of the pipelined datapath, and across different iterations of the encryption and decryption processes.

By randomizing activation/bypass statuses on a latch-by-latch basis across the non-linear computational stage of the pipelined datapath, the encryption and decryption engines of this disclosure introduce signal path diversity on a random, unpredictable basis. In turn, downstream logic gates that use the (potentially) unsynchronized signals as operands perform random, unpredictable levels of switching in order to synchronize the signals before processing the signal pair. The random levels of switching (or glitches) introduced by the techniques described in this disclosure cause the devices that include the encryption and/or decryption engines to exhibit erratic power traces, thereby providing hard-to-decipher inputs to potential SCA attackers.

In this way, the encryption engines and decryption engines of this disclosure disrupt the correlation between power consumption traces and the secret key that SCAs attempt to discern. Moreover, the encryption engines and decryption engines of this disclosure maintain standard-compliant data output while thwarting SCAs on the encryption and/or decryption processes. In this way, the encryption engines and decryption engines of this disclosure improve data security while maintaining data precision. The techniques of this disclosure may be implemented in various types of hardware, such as a system on a chip (SoC), in an application specific integrated circuit (ASIC), or in a field-programmable gate array (FPGA). The encryption engines and decryption engines of this disclosure provide data security improvements when implemented in user-facing artificial reality devices, as one non-limiting example.

In one example, this disclosure is directed to an artificial reality system. The artificial reality system includes a decryption datapath, a controller, and a head-mounted device (HMD). The decryption datapath includes a plurality of computational stages arranged in a pipeline configured to decrypt an encrypted block of data to form a decrypted block of data. A a non-linear computational stage of the plurality of computational stages included in the pipeline of the decryption datapath includes multiple asymmetric logical paths and multiple bypassable latches. A first signal traverses a first logical path and a second signal traverses a second logical path having a greater number of logical units than the first logical path. Each bypassable latch of the multiple bypassable latches is positioned in a respective logical path of the multiple asymmetric logical paths. The controller is configured to assign an individual random bit sequence to each bypassable latch of the multiple bypassable latches to randomly activate or randomly disable each bypassable latch of the multiple bypassable latches. The HMD configured to output artificial reality content including the decrypted block of data.

In another example, this disclosure is directed to an artificial reality system. The artificial reality system includes a head-mounted device (HMD), an encryption datapath, and a controller. The HMD is configured to receive a block of input data. The encryption datapath includes a plurality of computational stages arranged in a pipeline configured to encrypt a block of input data to form an encrypted block of data. A non-linear computational stage of the plurality of computational stages included in the pipeline of the encryption datapath includes multiple asymmetric logical paths and multiple bypassable latches. A first signal traverses a first logical path and a second signal traverses a second logical path having a greater number of logical units than the first logical path. Each bypassable latch of the multiple bypassable latches being positioned in a logical path of the multiple asymmetric logical paths. The controller is configured to assign an individual random bit sequence to each bypassable latch of the multiple bypassable latches to randomly activate or randomly deactivate each bypassable latch of the multiple bypassable latches.

In another example, this disclosure is directed to a decryption integrated circuit (IC). The decryption IC includes an interface, a decryption datapath, and a controller. The interface is configured to receive an encrypted block of data. The decryption datapath includes a plurality of computational stages arranged in a pipeline configured to decrypt the encrypted block of data to form a decrypted block of data. A non-linear computational stage of the plurality of computational stages included in the pipeline of the decryption datapath includes multiple asymmetric logical paths and multiple bypassable latches. A first signal traverses a first logical path and a second signal traverses a second logical path having a greater number of logical units than the first logical path. Each bypassable latch of the multiple bypassable latches being positioned in a respective logical path of the multiple asymmetric logical paths. The controller is configured to assign an individual random bit sequence to each bypassable latch of the multiple bypassable latches to randomly activate or randomly disable each bypassable latch of the multiple bypassable latches.

In another example, this disclosure is directed to an encryption integrated circuit (IC). The encryption IC includes an interface, an encryption datapath, and a controller. The interface is configured to receive a block of input data. The encryption datapath includes a plurality of computational stages arranged in a pipeline configured to encrypt the block of input data to form an encrypted block of data. A non-linear computational stage of the plurality of computational stages included in the pipeline of the encryption datapath includes multiple asymmetric logical paths and multiple bypassable latches. A first signal traverses a first logical path and a second signal traverses a second logical path having a greater number of logical units than the first logical path. Each bypassable latch of the multiple bypassable latches being positioned in a logical path of the multiple asymmetric logical paths. The controller is configured to assign an individual random bit sequence to each bypassable latch of the multiple bypassable latches to randomly activate or randomly deactivate each bypassable latch of the multiple bypassable latches.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 2C is an illustration depicting an example of a peripheral device configured to encrypt input data, and to decrypt and render encrypted artificial reality content in an SCA-resistant manner in accordance with the techniques of the disclosure.

DETAILED DESCRIPTION

Figure 1A:
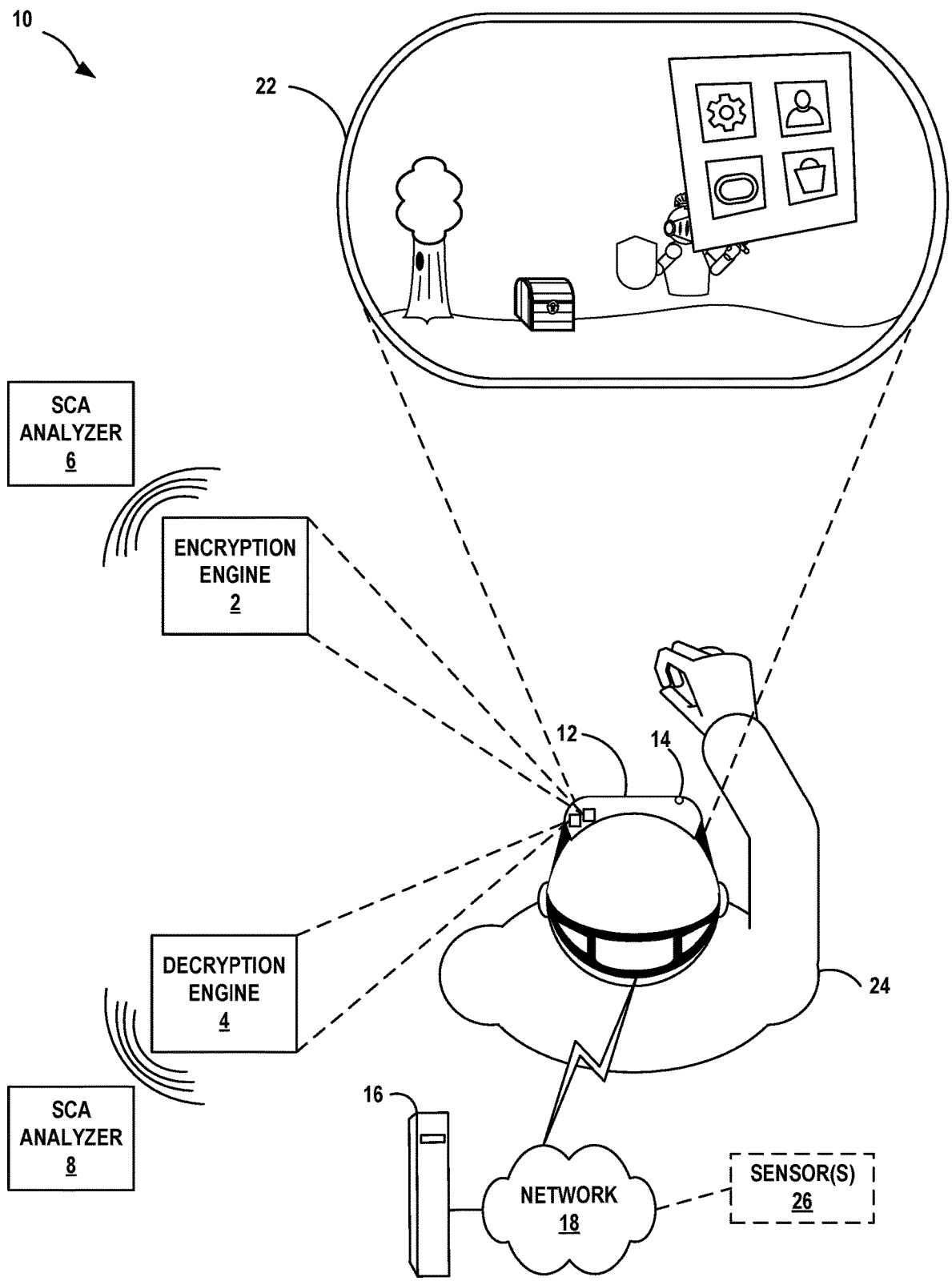
FIG. 1A is an illustration depicting an example artificial reality system that implements random glitch insertion as part of encryption and decryption operations, in accordance with aspects of this disclosure.

Many content provider systems, such as streaming systems, incorporate content protection or digital rights management technology that includes data encryption. The digital data encryption implemented by content provider systems may follow various standardized encryption mechanisms. The content consuming devices that receive the encrypted content perform generally reciprocal or "inverse" steps with respect to the encryption mechanisms, in accordance with the inverse steps specified in the corresponding standard according to which the data was encrypted.

Content consuming devices are often user-facing devices, and may also perform encryption of raw input data. In some examples, these user-facing devices may receive input data, encrypt the input data, and upload the encrypted data over a computer network, such as the Internet. These user-facing devices may encrypt input data for other purposes, as well. To the extent that certain portions of this disclosure focus on decryption-side functionalities of this disclosure performed by content consuming devices, it will be appreciated that those aspects of this disclosure provide benefits when implemented with respect to encryption-side functionalities performed by user-facing devices for digital content protection, as well.

Many devices configured to perform encryption and/or decryption are standalone devices that are relatively portable and battery-powered, and are therefore relatively vulnerable to attack or snooping mechanisms that rely on gleaning information about the hardware functioning of these devices. An example of such an attack mechanism is a so-called "side channel attack" or SCA. SCAs exploit one or more of timing information, current (flow of charge) information, power consumption data, electromagnetic traces and leaks, emitted sounds, etc.

Some examples of devices that perform encryption and/or decryption for content protection include artificial reality systems. Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, and may include one or more of virtual reality (VR), augmented reality (AR), mixed reality (MR), hybrid reality, or some combination and/or derivative thereof.

Typical artificial reality systems include one or more devices for rendering and displaying content to users. As one example, an artificial reality system may incorporate a head-mounted device (HMD) worn by a user and configured to output artificial reality content to the user. The artificial reality content may include completely generated content or generated content combined with captured content (e.g., real-world video and/or real-world images). Many user-facing artificial reality modalities, such as HMDs, are battery powered, and are therefore often designed to incorporate low power operations. The low-power designs and portable nature of HMDs make HMDs particularly vulnerable to SCAs, which are often performed using non-invasive, accessible, and relatively cheap off-the-shelf hacking equipment, such as SCA boards, trace analysis software, etc.

FIG. 1A is an illustration depicting an example artificial reality system 10, components of which are configured to thwart SCAs by encrypting input data and decrypting encrypted digital content using glitch randomization in the encryption and decryption pipelines, in accordance with aspects of this disclosure. Components of artificial reality system 10 incorporate combinatorial and sequential logic to generate (or alternatively, to suppress) signal path diversity on a random basis. In instances in which artificial reality system 10 randomly generates signal path diversity, the magnitude of the signal path diversity also varies on a random basis. The random signal path diversification of this disclosure injects glitches randomly into the pipelined encryption and decryption datapaths, causing unpredictable levels and durations of switching activity to synchronize signal pairs. The random levels of switching introduced by the combinatorial and sequential logic of this disclosure cause devices of artificial reality system 10 that perform encryption and/or decryption to exhibit erratic power traces, thereby providing hard-to-decipher inputs to potential SCA attackers.

Artificial reality system 10 is described herein as complying with the standardized decryption mechanisms described in the advanced encryption standard (AES) established by the United States National Institute of Standards and Technology (NIST) as a non-limiting example. It will be appreciated that artificial reality system 10 may, in other examples, implement the glitch randomization-based SCA-thwarting techniques of this disclosure while complying with other cipher standards, such as SM4 (formerly SMS4, a block cipher standard set forth in the Chinese National Standard for Wireless LAN WAPI), Camellia (developed by Mitsubishi Electric and NTT Corporation of Japan), etc. The glitch randomization techniques of this disclosure can be implemented in digital logic, and are therefore sufficiently generic to provide SCA mitigation in various types of encryption engines and/or decryption engines, such as those that comply with the standards listed above and other standardized or non-standardized decryption engines, such as in artificial reality systems on a chip (SoCs).

While the SCA-thwarting encryption and decryption techniques of this disclosure are described with respect to being implemented within artificial reality system 10 as an example, it will be appreciated that the applicability of the decryption techniques of this disclosure are not limited to artificial reality systems. The encryption and decryption techniques of this disclosure can also be implemented to improve data security in other types of computing devices, including, but not limited to, various types of battery-powered SoC-driven and/or application specific integrated circuit (ASIC)-driven technologies.

The low-power design of various SoCs, such as artificial reality SoCs, are particularly vulnerable to SCAs, because artificial reality SoCs often process user-confidential information. Examples of user-confidential information that artificial reality SoCs often process include personal data, biometrics, user specific models, and various others. Artificial reality SoCs therefore represent relatively attractive hacking targets, for surreptitious acquisition of high value assets, such as the examples of digital assets listed above. For example, SCAs may extract secret key (e.g., cipher key and/or inverse cipher key) information by conducting and statistically analyzing current traces or electromagnetic (EM) traces.

Additionally, unlike cloud/server platforms in which large overall system power consumption tends to obfuscate encryption/decryption-related switching activity, artificial reality platforms are often power optimized to prolong battery life. The power consumption statistics of artificial reality platforms are not well-hidden by other power-consuming functions. For this reason, artificial reality systems, particularly HMDs, expose a broader attack surface by making it easier for an attack device, such as SCA analyzers to isolate encryption-related and/or decryption-related power consumption, and to analyze the power consumption statistics. The non-invasive nature of and the relatively easy access to SCA-driven hacking equipment further exacerbates the vulnerability of artificial reality HMDs.

The glitch randomization techniques of this disclosure enable one or more elements of artificial reality system 10 to disrupt the correlation, thereby obfuscating the power consumption metrics that are available to SCA hacking equipment, thereby reducing or potentially even fully scrambling the attack surface of these components of artificial reality system 10. Artificial reality system 10 includes head-mounted device (HMD) 12 and console 16. In some examples, artificial reality system 10 also includes one or more external sensors 26.

As shown, HMD 12 is typically worn by user 24 and includes an electronic display and optical assembly for presenting artificial reality content 22 to user 24. In addition, HMD 12 includes one or more sensors (e.g., accelerometers) for tracking motion of HMD 12. HMD 12 may include one or more image capture devices 14, e.g., cameras, line scanners, and the like. Image capture devices 14 may be configured for capturing image data of the surrounding physical environment. In some examples, image capture devices 14 include inward-facing camera hardware and/or scanning hardware configured to capture facial images, retina scans, iris scans, etc. of user 24 for user authentication and for other purposes.

Console 16 is shown in the example of FIG. 1A as a single computing device, such as a gaming console, workstation, a desktop computer, or a laptop. In other examples, console 16 may be distributed across a plurality of computing devices, such as a distributed computing network, a data center, or a cloud computing system. HMD 12, console 16, HMD 12, and (in relevant instances, sensor(s) 26) may be communicatively coupled via network 18 (as shown in the example of FIG. 1A). Network 18 may incorporate a wired network and/or wireless network, such as a local area network (LAN), a wide area network (WAN), a Wi-Fi™ based network or 5G network, an Ethernet® network, a mesh network, a short-range wireless (e.g., Bluetooth®) communication medium, and/or various other computer interconnectivity infrastructures and standards.

HMD 12 is shown in this example as being in communication with (e.g., tethered to or in wireless communication with) console 16. In other implementations, HMD 12 operates as a standalone, mobile platform configured to process artificial reality content. HMD 12 and/or console 16 may execute an artificial reality application to construct artificial reality content 22 for display to user 24. For example, HMD 12 and/or console 16 may construct the artificial reality content based on tracking pose information and computing pose information for a frame of reference, typically a viewing perspective of HMD 12. Artificial reality system 10 may use external sensors 26 and/or external camera hardware to capture three-dimensional (3D) information within the real-world, physical environment at which user 24 is positioned.

HMD 12 includes encryption engine 2 and decryption engine 4. Encryption engine 2 encrypts various raw or preprocessed or postprocessed input data, such as images captured by outward-facing camera hardware of image capture devices 14 of the surroundings of user 24 for analysis to determine location, weather, things of interest, places of interest etc. Another example of input data that encryption engine 2 may encrypt is facial image information that outward-facing camera hardware of image capture devices 14 captures for other people within the field of view (FoV) of HMD 12, to be used to identify such people using facial recognition technology. Yet another example of input data that encryption engine 2 may encrypt is biometric information of user 24, such as facial images captured by inward-facing camera hardware of image capture devices 14, or retina scans or iris scans captured by other inward-facing scanning hardware of HMD 12.

Encryption engine 2 may encrypt other examples of input data, as well, for a variety of intended end-uses. In some examples, HMD 12 may communicate the cipher text generated by encryption engine 2 to other devices, such as to console 16, to a peripheral device tethered to HMD 12 or paired to HMD 12 using short-range wireless communication technology, or over network 18 to a cloud-based system for further analysis or relaying. Decryption engine 4 may decrypt cipher text (encrypted input data) generated by and received from various sources. In some examples, decryption engine 4 may decrypt cipher text that HMD 12 receives directly or indirectly from an upstream streaming service to obtain one or more of video data, audio data, or haptic output data. In other examples, decryption engine 4 may decrypt cipher text that HMD 12 receives directly or indirectly from an external system (e.g., another artificial reality system) to recover information identifying other users in an interactive gaming environment.

FIG. 1A illustrates SCA analyzers 6 and 8. SCA analyzer 6 represents a device that a malicious user (or SCA attacker) may use to isolate encryption-related power consumption of HMD 12 and analyze the power consumption statistics to surreptitiously obtain the cipher key that encryption engine 2 is applying at present. SCA analyzer 8 represents a device that an SCA attacker may use to isolate decryption-related power consumption of HMD 12 and analyze the power consumption statistics to surreptitiously obtain the inverse cipher key that encryption engine 2 is applying at present. The SCA attacker(s) may apply the cipher key and/or inverse cipher key(s) surreptitiously obtained in this way to reverse-engineer the secure content processed by encryption engine 2 and/or decryption engine 4, causing a security breach of sensitive or otherwise protected information.

The non-invasive nature of and the relatively easy access to SCA-driven hacking equipment (such as SCA analyzers 6 and/or 8) further exacerbates the vulnerability of artificial reality HMDs (such as HMD 12). Because SCA-driven hacking equipment typically obtains cipher key information and/or inverse cipher key information (collectively, a "secret key") for protected content by "sniffing" current leakage information externally, previous SCA-protection measures have focused on adding hardware components that introduce signals that obfuscate or hide the current leakage. Such additional hardware infrastructure is not well-suited to low-profile device designs and/or power-optimized battery-powered devices, due to the added hardware infrastructure and added energy consumption.

Encryption engine 2 and decryption engine 4 are configured to obfuscate the current leakage information by randomly inserting glitches of varying magnitudes, or by randomly suppressing some glitches to synchronize signal pairs. Using the glitch randomization techniques of this disclosure, encryption engine 2 and decryption engine 4 introduce unpredictability to the current information that is leaked and sniffed by SCA analyzers 6 and 8, such that SCA analyzers 6 and 8 cannot derive the secret key, due to the erratic sequencing and amperage of any resulting current usage information leaked from HMD 12.

Encryption engine 2 and decryption engine 4 are implemented separately in silicon, at non-overlapping locations. As such, in use-case scenarios in which encryption engine 2 and decryption engine 4 are performing encryption and decryption operations simultaneously, the glitch randomization techniques of this disclosure provide added security to each of encryption engine 2 and decryption engine 4. This added security stems from the simultaneous power trace randomization performed by both of encryption engine 2 and decryption engine 4, thereby further obfuscating the already-randomized power traces output by one another via the single hardware modality of HMD 12. In this way, the glitch randomizing configurations of this disclosure enable encryption engine 2 and decryption engine 4 to disrupt power consumption races and the secret key presently under use, while maintaining data precision and standards-compliance by producing encrypted and decrypted output data that are unchanged from the outputs of traditional encryption and decryption techniques.

While shown in FIG. 1A and described above as being included in HMD 12, encryption engine 2 and decryption engine 4 may be included in console 16 in some examples, or may be included in a peripheral device coupled to HMD 12 in other examples. In these examples, console 16 or the peripheral device may invoke encryption engine 2 and decryption engine 4 to encrypt input data and to decrypt encrypted data received over network 18. In these examples console 16 or the peripheral device may render the decrypted data, and communicate the decrypted content to HMD 12 for display to user 24. Similarly, in these examples, console 16 or the peripheral device may communicate the encrypted data over network 18, or process the encrypted data in some other manner. The data security enhancements of this disclosure are particularly helpful in examples in which console 16 or the peripheral device are of portable form factors, and thereby expose a larger attack surface to SCA analyzers 6 and 8.

The glitch randomizing configurations of this disclosure call for relatively low redesign effort and relatively low overhead with respect to additional logic. As such, encryption engine 2 and decryption engine 4 may implement the SCA-mitigation measures of this disclosure without requiring significant changes to the overall infrastructure of HMD 12. As such, encryption engine 2 and decryption engine 4 may effect the SCA-mitigation measures of this disclosure without significantly affecting the wearability of HMD 12, which may take the form factor of headsets or glasses, or of portable implementations of console 16 in examples in which encryption engine 2 and decryption engine 4 are included in console 16, or of a portable peripheral device that may be coupled to HMD 12 to offload a portion of the computing resource overhead of HMD 12. In this way, the glitch randomizing configurations of this disclosure enable low-profile designs with respect to HMD 12 and/or other devices that user 24 may use to avail of the capabilities of artificial reality system 10.

Figure 1B:
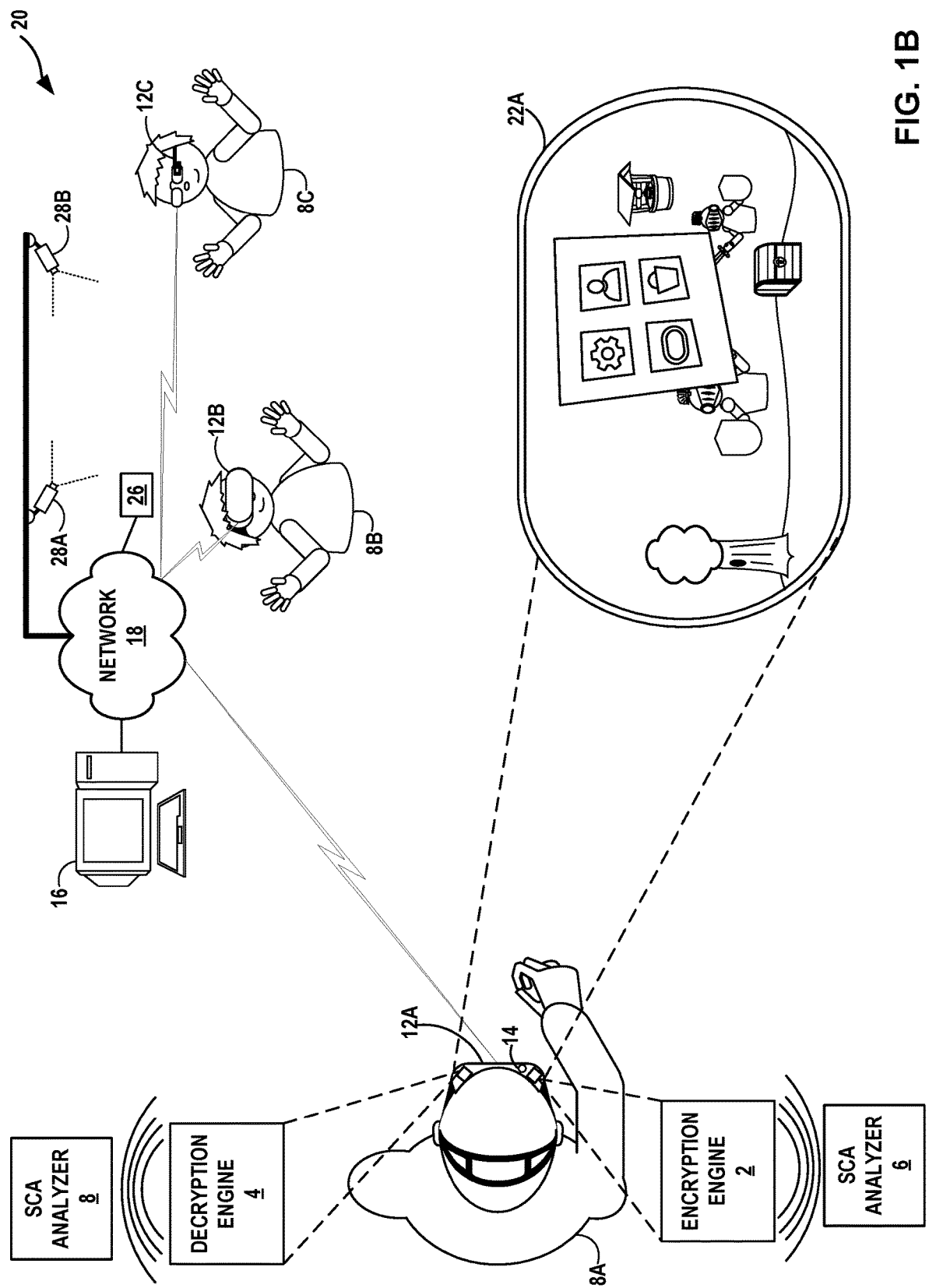
FIG. 1B is an illustration depicting another example artificial reality system that implements random glitch insertion as part of encryption and decryption operations, in accordance with aspects of this disclosure.

FIG. 1B is an illustration depicting another example artificial reality system 20 that implements glitch randomization-based SCA-thwarting decryption in accordance with aspects of this disclosure. Similar to artificial reality system 10 of FIG. 1A, encryption engine 2 and decryption engine 4 included in HMD 12A of FIG. 1B may implement the glitch randomization techniques of this disclosure to improve data security, such as by improving resistance to SCAs performed by SCA analyzers 6 and 8. Encryption engine 2 and decryption engine 4 may randomly insert/suppress glitches during disparate time frames, during partially overlapping time frames, or during fully overlapping time frames, depending on the time frames during which HMD 12A invokes encryption engine 2 and decryption engine 4 to perform encryption and decryption operations, respectively.

In the example of FIG. 1B, artificial reality system 20 includes external cameras 28A and 28B (collectively, "external cameras 28"), HMDs 12A-12C (collectively, "HMDs 12"), console 16, and sensors 26. As shown in FIG. 1B, artificial reality system 20 represents a multi-user environment in which an artificial reality application executing on console 16 and/or HMDs 12 presents artificial reality content to each of users 24A-24C (collectively, "users 24") based on a current viewing perspective of a corresponding frame of reference for the respective user 24. That is, in this example, the artificial reality application constructs artificial reality content by tracking and computing pose information for a frame of reference for each of HMDs 12. Artificial reality system 20 uses data received from external cameras 28 and/or HMDs 12 to capture 3D information within the real-world environment, such as motion by users 24 and/or tracking information with respect to users 24, for use in computing updated pose information for a corresponding frame of reference of HMDs 12.

HMDs 12 operate concurrently within artificial reality system 20. In the example of FIG. 1B, any of users 24 may be a "player" or "participant" in the artificial reality application, and any of users 24 may be a "spectator" or "observer" in the artificial reality application. HMDs 12 of FIG. 1B may each operate in a substantially similar way to HMD 12 of FIG. 1A. For example, HMD 12A may operate substantially similar to HMD 12 of FIG. 1A, and may receive user inputs by tracking movements of the hands of user 24A.

Each of HMDs 12 implements a respective user-facing artificial reality platform, and outputs respective artificial content, although only artificial reality content 22A output by HMD 12A is shown in FIG. 1B, purely for the purpose of ease of illustration. As shown in FIG. 1B, two or more of HMDs 12 may, but need not necessarily, conform to the same form factor. Various form factors of HMDs 12 are shown in FIG. 1B, including a goggle form factor and an eyeglass form factor.

Figure 2A:
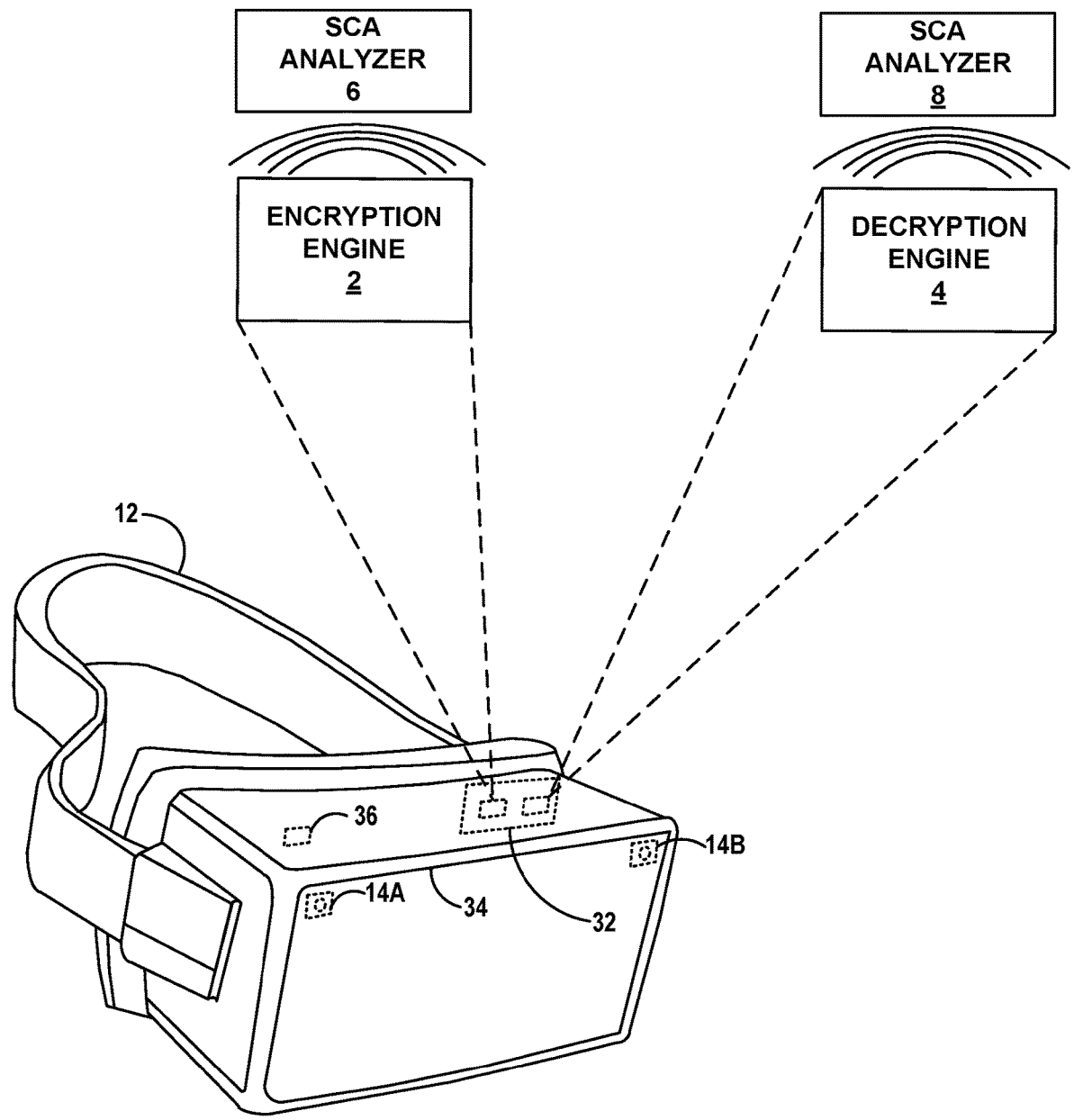
FIG. 2A is an illustration depicting an example HMD configured to encrypt input data, and to decrypt and render encrypted artificial reality content in an SCA-resistant manner in accordance with the techniques of the disclosure.

FIG. 2A is an illustration depicting an example HMD 12 configured to decrypt and render encrypted artificial reality content, and to encrypt input data before further processing/transmission in accordance with the techniques of the disclosure. HMD 12 of FIG. 2A may be an example of any of HMDs 12 of FIGS. 1A and 1B. In some examples, HMD 12 may be part of an artificial reality system that incorporates other devices and network intermediaries, such as in the examples of artificial reality systems 10 and 20 illustrated in FIGS. 1A and 1B. In other examples, HMD 12 may operate as a standalone, mobile artificial realty system configured to implement the SCA-thwarting techniques described herein. In the example of FIG. 2A, HMD 12 takes the general form factor of a headset or goggles.

In this example, HMD 12 includes a front rigid body and a band to secure HMD 12 to user 24. In addition, HMD 12 includes an interior-facing electronic display 34 configured to present artificial reality content to user 24. Electronic display 34 may include, be, or be part of any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 34 relative to the front rigid body of HMD 12 is used as a frame of reference, also referred to as a local origin, when tracking the position and orientation of HMD 12 for rendering artificial reality content according to a current viewing perspective of HMD 12 and the user.

Figure 2B:
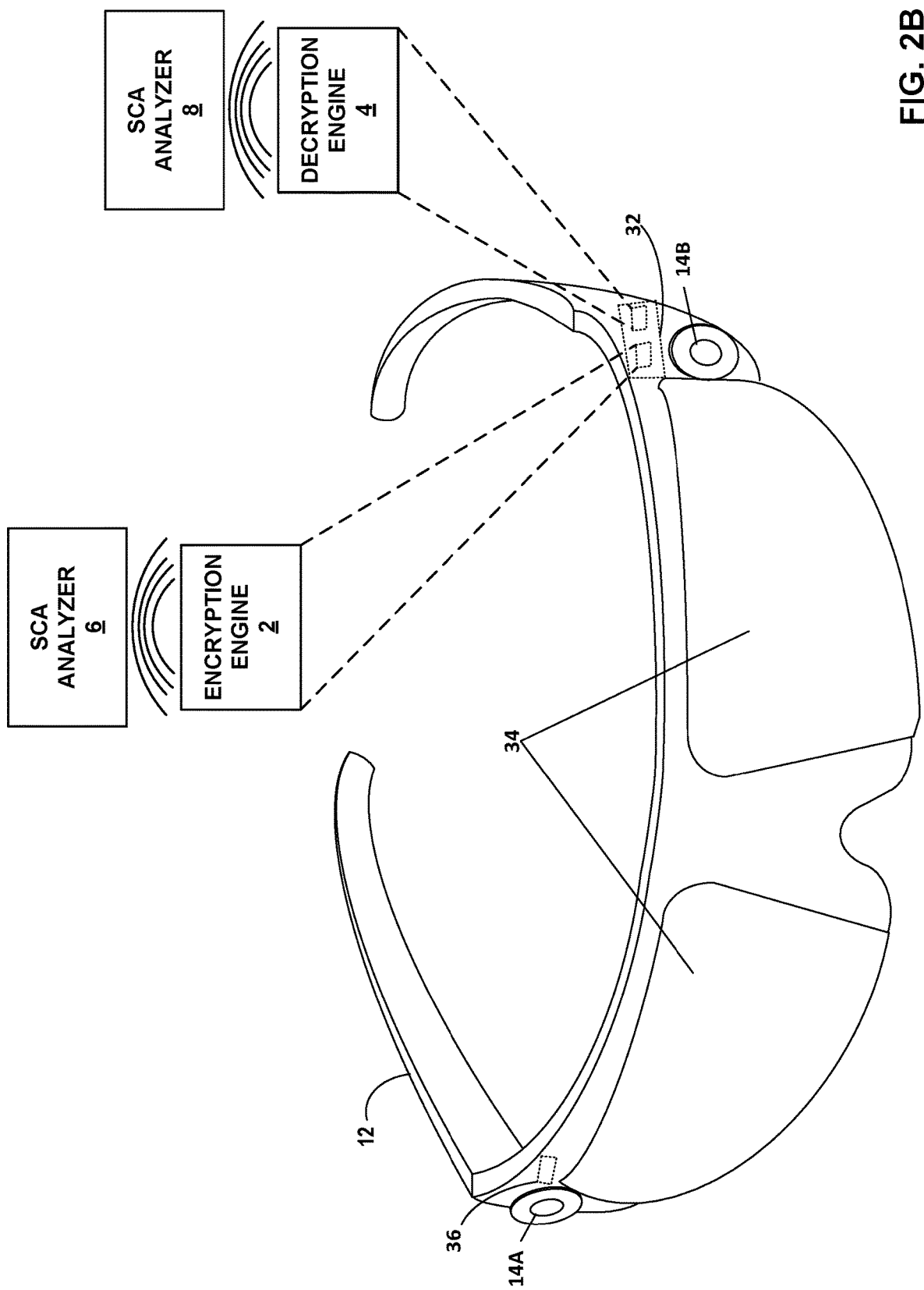
FIG. 2B is an illustration depicting another example of an HMD configured to encrypt input data, and to decrypt and render encrypted artificial reality content in an SCA-resistant manner in accordance with the techniques of the disclosure.

FIG. 2B is an illustration depicting another example of HMD 12 configured to operate in accordance with the techniques of the disclosure. HMD 12 of FIG. 2B may be an example of any of HMDs 12 of FIGS. 1A and 1B. HMD 12 may be part of an artificial reality system, such as artificial reality systems 10, 20 of FIGS. 1A, 1B, or may operate as a stand-alone, mobile artificial realty system configured to implement the techniques described herein. In the example of FIG. 2B, HMD 12 takes the general form factor of glasses.

In this example, HMD 12 includes a front rigid body and two stems to secure HMD 12 to a user, e.g., by resting over the user's ears. Elements of FIG. 2B that share reference numerals with elements of FIG. 2A perform like-functionalities, and are not described separately with respect to FIG. 2B for the sake of brevity. In the example of FIG. 2B, electronic display 34 may be split into multiple segments, such as into two segments, each segment corresponding to a separate lens disposed on the rigid front body of HMD 12. In other examples in accordance with FIG. 2B, electronic display 34 may form a contiguous surface that spans both lenses and the lens-connecting bridge (i.e., the over-the-nose portion) of the rigid front body of HMD 12. In some examples in accordance with the form factor illustrated in FIG. 2B, electronic display 34 may also encompass portions of HMD 12 that connect the lenses of the front rigid body to the stems, or optionally, portions of the stems themselves. These various designs of electronic display 34 in the context of the form factor of HMD 12 shown in FIG. 2B improve accessibility for users having different visual capabilities, eye movement idiosyncrasies, etc.

In the examples illustrated in each of FIGS. 2A & 2B, HMD 12 further includes one or more motion sensors 36, such as one or more accelerometers (also referred to as inertial measurement units or "IMUs") that output data indicative of current acceleration of HMD 12, GPS sensors that output data indicative of a location of HMD 12, radar, or sonar that output data indicative of distances of HMD 12 from various objects, or other sensors that provide indications of a location or orientation of HMD 12 or other objects within a physical environment.

In the examples illustrated in each of FIGS. 2A & 2B, HMD 12 includes integrated image capture devices 14A and 14B (collectively, "image capture devices 14"). Image capture devices 14 may include still image camera hardware, video camera hardware, laser scanners, Doppler® radar scanners, fundus photography hardware, infrared imaging cameras, depth scanners, or the like. Image capture devices 14 may include outward-facing and/or inward-facing image capture hardware, and include any hardware configured to capture image data representative of a surrounding physical environment, and optionally, to preprocess and/or post process the captured image data. Outward-facing camera hardware of image capture devices 14 may capture image data of the physical environment outside of HMD 12, such as, but not limited to, the real-world environment at which user 24 is positioned. Inward-facing camera hardware of image capture devices 14 may capture image data of wearer of HMD 12, such as facial images and/or retina scans and/or temperature information of user 24.

In the examples illustrated in FIGS. 2A & 2B, internal control unit 32 of HMD 12 includes encryption engine 2 and decryption engine 4 illustrated in FIGS. 1A & 1B. As described above with respect to FIGS. 1A & 1B, encryption engine 2 and decryption engine 4 are configured in accordance with aspects of this disclosure to randomize signal path diversity-driven glitches to upset the correlations between the power trace information leaked by HMD 12 and the encryption and/or decryption operations performed by encryption engine 2 and/or decryption engine 4, respectively.

FIGS. 2A & 2B also illustrate SCA analyzers 6 and 8. Each of SCA analyzers 6 and 8 represents an SCA board (e.g., an FPGA-based board or ASIC-based board), a so-called "skimmer," or any other device configured to snoop on the performance metrics of HMD 12. Hackers may use SCA analyzers 6 and/or 8 to implement various types of SCAs, such as a correlation power attack (CPA) or a direct memory access (DMA) attack. To perform a CPA, SCA analyzer 6 or 8 provides an input data set to HMD 12. A common example of a CPA involves providing one million test vectors that undergo encryption or decryption with a constant secret key, such as would be performed by an encryption engine that performs encryption operations to encrypt input data to form cipher text, or a decryption engine that performs decryption (operations that are reciprocal to the above-described encryption operations) to decrypt the cipher text. Various examples are described with respect to AES-compliant encryption and decryption, but it will be appreciated that the glitch randomization techniques of this disclosure are also applicable to encryption and decryption operations that conform to other standards or are not compliant to any presently standard.

Each of SCA analyzers 6 and 8 collects power traces of the AES-compliant system, and analyzes the current traces against a hypothesis that predicts the outcome for a given guess of the key. SCA analyzers 6 and 8 guess the secret key (round key and inverse round key, respectively) one byte at a time, thereby providing 256 possibilities for every byte. SCA analyzers 6 and 8 compute statistical correlation coefficients between the measured power traces and each hypothesis across all 256 candidate key bytes. SCA analyzers 6 and 8 each select the pairing that produces the highest correlation metric as the secret key guess. An important pre-processing step required for SCA analyzers 6 and 8 to compute the correlation metrics is to first align the power traces. By first aligning the power traces, SCA analyzers 6 and 8 ensure that the value of the power signature gleaned from different traces each correspond to a unique switching event in the AES-compliant SoC (or SoC configured in another way, as the case may be).

According to configurations of this disclosure, encryption engine 2 and decryption engine 4 exploit the reliance of SCA analyzers 6 and 8 on the pre-processing step of aligning the power traces in order to generate the individual hypotheses corresponding to the unique power traces. Encryption engine 2 and decryption engine 4 implement the SCA-thwarting techniques of this disclosure by disrupting the alignment operations that SCA analyzers 6 and 8 perform as pre-processing steps in the above-described CPAs.

Encryption engine 2 and decryption engine 4 randomize the insertion and suppression of glitches, as well as the acuity of any randomly inserted glitches that cause erratic levels of downstream switching, thereby making the power traces collected by SCA analyzers 6 and 8 unpredictable. By introducing unpredictability to the power trace information collected by SCA analyzers 6 and 8, encryption engine 2 and decryption engine 4 disrupt the correlation between the power traces and the secret key (cipher key or inverse cipher key, as the case may be), thereby jumbling the essential preprocessing step of power trace alignment upon which SCA analyzers 6 and 8 rely in performing the CPA. Because SCA analyzers 6 and 8 form the power trace correlations by relying on particular chronological sequences based on reverse engineering the AES-specified procedures to arrive at the encrypted cipher text or the decrypted output, encryption engine 2 and decryption engine 4 implement the glitch-randomizing operations of this disclosure to provide power traces that SCA analyzers 6 and 8 are not configured to use to accurately reconstruct as part of performing a CPA.

FIG. 2C is an illustration depicting an example of HMD 12 in communication with an example peripheral device 42. In the example of FIG. 2C, peripheral device 42 performs some or all of the glitch randomization-based SCA-thwarting techniques of this disclosure. HMD 12 of FIG. 2C may be an example of any of HMDs 12 of FIGS. 1A and 1B, and takes the form factor of glasses, as in the case of HMD 12C of FIG. 1B and HMD 12 of FIG. 2B. HMD 12 may be part of an artificial reality system, such as artificial systems 10 and/or 20 of FIGS. 1A and 1B, in some examples. In other examples, HMD 12 may operate as a standalone, mobile artificial reality system configured to implement the glitch randomization-based SCA-thwarting techniques described herein. In the example of FIG. 2C, image capture devices 14 may capture image data representative of various objects, including peripheral device 42 and/or of the hand(s) of user 24 in the physical environment that are within the FoV of image capture devices 14, which may generally correspond to the viewing perspective of HMD 12.

In the example of FIG. 2C, control unit 32 is implemented in peripheral device 42, which, in turn, is communicatively coupled to HMD 12. Control unit 32 of peripheral device 42 includes encryption engine 2 and decryption engine 4 in the example of FIG. 2C. In some examples, peripheral device 42 may receive encrypted data (e.g., streaming video data, etc.) over network 18, and may invoke decryption engine 4 to decrypt the encrypted data to be used in the generation and rendering of artificial reality content 22 for display on electronic display 34.

In some examples, peripheral device 42 may receive encrypted data from HMD 12 (e.g., encrypted facial images and/or retina scans of user 24), and may invoke decryption engine 4 to decrypt the received cipher text for user authentication purposes. Peripheral device 42 may invoke encryption engine 2 to encrypt data for various purposes, such as for encryption prior to transmission over network 18, or for other purposes, as described above with respect to FIGS. 1A-2B.

Surface 38 of peripheral device 42 represents an input component or a combined input/output component of peripheral device 42. Surface 38 may include sensing capabilities, such as those of a touchscreen (e.g., a capacitive touchscreen, resistive touchscreen, surface acoustic wave (SAW) touchscreen, infrared touchscreen, optical imaging touchscreen, acoustic pulse recognition touchscreen, or any other touchscreen), touchpad, buttons, trackball, scroll wheel, or other presence-sensitive hardware that uses capacitive, conductive, resistive, acoustic, or other technology to detect touch and/or hover input.

Surface 38 may enable peripheral device 42 to receive touch input or gesture input without direct contact with surface 38. User 24 may provide these touch or gesture inputs to peripheral device 42 to provide instructions directly to peripheral device 42, or indirectly to HMD 12 and/or other components of an artificial reality system in which HMD 12 is deployed. In some examples, processing circuitry of HMD 12 may utilize image capture devices 14 to analyze configurations, positions, movements, and/or orientations of peripheral device 42, of the hand(s) or digit(s) thereof of user 24 to enable to provide input using gestures such as drawing gestures or typing gestures provided via a graphical keyboard.

Peripheral device 42 can communicate input to HMD 12 (and/or console 16) using wireless communications links (e.g., near-field communication of short-range wireless communication such as Bluetooth®, etc.), or using wired communication links, or combinations thereof, or using other types of communication links. In the example of FIG. 2C, peripheral device 42 is also communicatively coupled to network 18, thereby enabling peripheral device 42 to upload cipher text generated by encryption engine 2 to securely communicate data to remote devices over network 18.

In this way, peripheral device 42 may offload various hardware and resource burdens from HMD 12, which enables low-profile form factor designs of HMD 12. Peripheral device 42 also serves as a communications intermediary between HMD 12 and devices at remote locations, via network 18. Further details of peripheral device 42 are described in U.S. patent application Ser. No. 16/506,618 (filed on 9 Jul. 2019), the entire content of which is incorporated herein by reference.

Control unit 32 may represent hardware or a combination of hardware and software configured to support various components (e.g., encryption engine 2 and/or decryption engine 4), or modules, elements, or operations described herein. In examples in which encryption engine 2 is formed as an integrated circuit (IC), encryption engine 2 represents an "encryption IC." In examples in which decryption engine 4 is formed as an IC, decryption engine 4 represents a "decryption IC." As such, the terms "encryption IC" and "decryption IC" may be used interchangeably with encryption engine 2 and decryption engine 4, respectively.

Figure 2D:
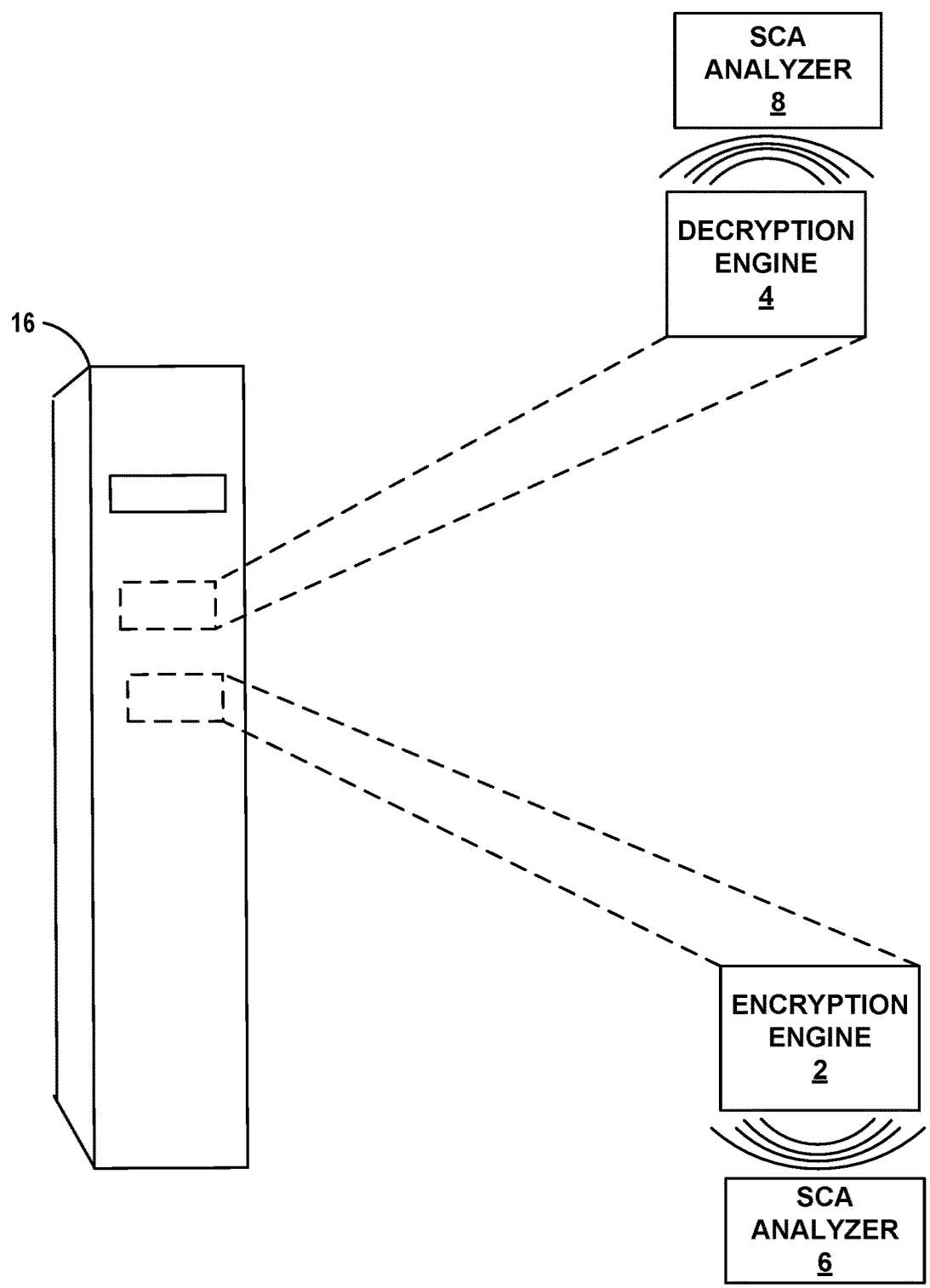
FIG. 2D is an illustration depicting an example of a console configured to encrypt input data, and to decrypt and render encrypted artificial reality content in an SCA-resistant manner in accordance with the techniques of the disclosure.

FIG. 2D is an illustration depicting an example of a console that performs the glitch randomization-based SCA-thwarting techniques of this disclosure. FIG. 2D is an illustration depicting an example in which console 16 includes encryption engine 2 and decryption engine 4. That is, in the example illustrated in FIG. 2D, encryption engine 2 and decryption engine 4 are part of console 16, instead of being implemented in HMD 12 as in the examples of FIGS. 2A & 2B and instead of being implemented in peripheral device 42 as in the example of FIG. 2C.

In various use case scenarios in accordance with FIG. 2D, hacker(s) may place SCA analyzer 6 and/or SCA analyzer 8 in the vicinity of console 16, in an attempt to obtain the power traces used for a CPA. SCA analyzers 6 and/or 8 may carry out a CPA with significant accuracy, especially in cases in which console 16 is a battery-powered handheld device that is optimized for low power usage. In these cases, console 16 may not put out large-scale power information for non-encryption, non-decryption operations to an extent that is sufficient to conceal the power information related to encryption and/or decryption information.

In the example of FIG. 2D, encryption engine 2 and decryption engine 4 may implement the glitch randomization described with respect to FIGS. 1A-2C, but in the context of console 16. As such, whether implemented within HMD 12, within peripheral device 42, or within console 16, encryption engine 2 and decryption engine 4 thwart SCAs, such as CPAs, by randomly inserting and/or randomly suppressing glitches arising from signal path diversity in non-linear computational stages of the encryption and decryption processes.

By creating misalignments in the power traces collected by SCA analyzer 6 and/or SCA analyzer 8, encryption engine 2 and decryption engine 4 disrupt the data arrangement upon which SCA analyzer 6 and/or SCA analyzer 8 may rely to carry out a CPA, in a variety of deployments, as described with respect to FIGS. 2A-2D. In this way, encryption engine 2 and decryption engine 4 implement the techniques of this disclosure to improve data security in a variety of configurations with which artificial reality systems 10 and 20 are compatible.

Figure 3A:
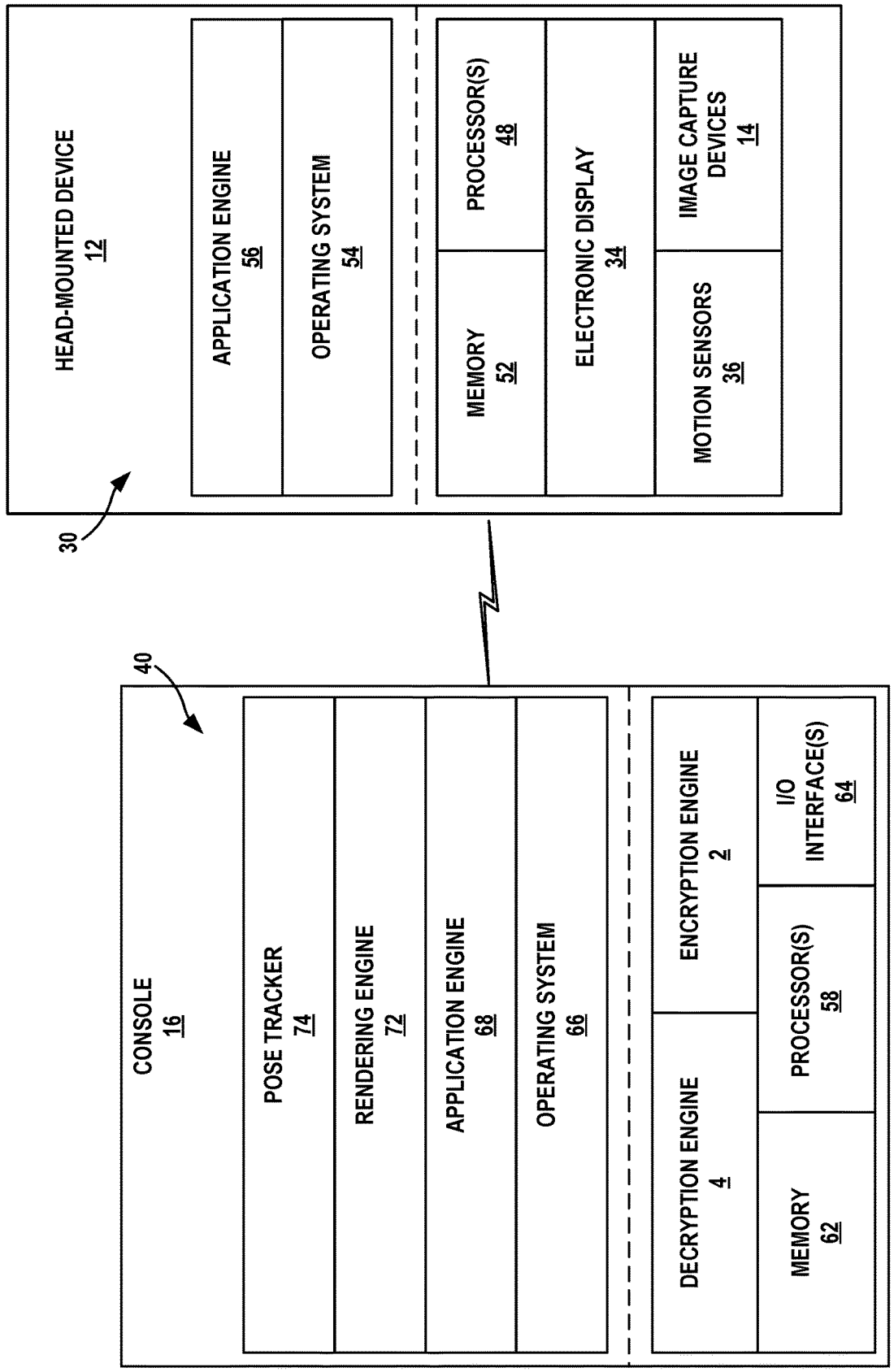
FIGS. 3A-3D are block diagrams showing example implementations of devices of FIGS. 1A-2D that are configured to encrypt input data, and to decrypt and render encrypted artificial reality content, in accordance with aspects of this disclosure.

FIGS. 3A-3D are block diagrams showing example implementations of devices of the artificial reality systems of FIGS. 1A-2D. FIG. 3A is a block diagram showing example implementations of console 16 and HMD 12 of artificial reality systems 10 & 20 of FIGS. 1A & 1B. In this example, HMD 12 includes one or more processors 48 and memory 52 that, in some examples, provide a computer platform for executing an operating system 54. Operating system 54 may represent an embedded, real-time multitasking operating system, for instance, or other type of operating system. In turn, operating system 54 provides a multitasking operating environment for executing one or more software components 30, including application engine 56. Processor(s) 48 may be coupled to one or more of electronic display 34, motion sensors 36, and image capture devices 14. In some examples, processor(s) 48 and memory 52 may be separate, discrete components. In other examples, memory 52 may be on-chip memory collocated with processors 48 within a single integrated circuit.

In general, console 16 represents a computing device that processes image and tracking information received from external cameras 28 (FIG. 1B) and/or HMD 12 to perform motion detection, user interface generation, and various other artificial reality-related functionalities for HMD 12. In some examples, console 16 is a single computing device, such as a workstation, a desktop computer, a laptop, or a gaming system. In some examples, at least a portion of console 16, such as one or more processor(s) 58 and/or memory 62, may be distributed across a cloud computing system, a data center, or across a network, such as the Internet, or another public or private communications network, for instance, broadband, cellular, Wi-Fi™, and/or other types of communication networks for transmitting data between computing systems, servers, and computing devices.

In the example of FIG. 3A, console 16 includes one or more processors 58 and memory 62 that, in some examples, provide a computer platform for executing an operating system 66. Operating system 66 may represent an embedded, real-time multitasking operating system, for instance, or other type of operating system. In turn, operating system 66 provides a multitasking operating environment for executing one or more software components 40. Processor(s) 58 may be coupled to one or more I/O interfaces 64, which provide one or more I/O interfaces for communicating with external devices, such as a keyboard, game controllers, display devices, image capture devices, HMDs (e.g., HMD 12), and the like. Moreover, one or more I/O interfaces 64 may include one or more wired or wireless network interface controllers (NICs) for communicating with a network, such as network 18.

Each of processors 48, 58 may comprise any one or more of a multi-core processor, a controller, a digital signal processor (DSP), an application specific integrated circuit (ASIC), a field-programmable gate array (FPGA), processing circuitry (e.g., fixed function circuitry or programmable circuitry or any combination thereof) or equivalent discrete or integrated logic circuitry. Memory 52, 62 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

Software applications 40 of console 16 operate to provide an overall artificial reality application. In this example, software applications 40 include application engine 68, rendering engine 72, and pose tracker 74. In general, application engine 68 includes functionality to provide and present an artificial reality application, e.g., a teleconference application, a gaming application, a navigation application, an educational application, a training application, a simulation application, or the like. Application engine 68 may include, for example, one or more software packages, software libraries, hardware drivers, and/or Application Program Interfaces (APIs) for implementing an artificial reality application on console 16. Responsive to control by application engine 68, rendering engine 72 generates artificial reality content 22 (e.g., incorporating 3D artificial reality content) for display to user 24 by application engine 56 of HMD 12.

Application engine 68 and rendering engine 72 construct artificial reality content 22 for display to user 24 in accordance with current pose information for a frame of reference, typically a viewing perspective of HMD 12, as determined by pose tracker 74. Based on the current viewing perspective, rendering engine 72 constructs artificial reality content 22 (e.g., 3D artificial content) which may in some cases be overlaid, at least in part, upon the real-world 3D environment of user 24. During this process, pose tracker 74 operates on sensed data received from HMD 12, such as movement information and user commands, and, in some examples, data from any external sensors 26 (shown in FIGS. 1A & 1B), such as external cameras 28 of FIG. 1B, to capture 3D information within the real-world environment, such as motion by user 24 and/or feature tracking information with respect to user 24. Based on the sensed data, pose tracker 74 determines a current pose for the frame of reference of HMD 12 and, in accordance with the current pose, constructs artificial reality content 22 for communication, via one or more I/O interfaces 64, to HMD 12 for display to user 24.

In the example of FIG. 3A, console 16 includes encryption engine 2 and decryption engine 4, which are described above with respect to FIGS. 1A-2C. In some examples, console 16 may receive encrypted data, using I/O interface(s) 64, from an external system (e.g., an upstream streaming service), and may invoke decryption engine 4 to decrypt the encrypted data that was received. In some of these examples, console 16 may invoke rendering engine 72 to then render the decrypted data, and console 16 may provide the rendered data to HMD 12 in form of artificial reality content 22.

In other examples, console 16 may receive, via I/O interface(s) 64, encrypted data (e.g., encrypted facial images and/or encrypted iris scan information captured by inward-facing camera/scanner hardware of HMD 12) from HMD 12. In these examples, console 16 may invoke decryption engine 4 to decrypt the encrypted data received from HMD 12, and further process the decrypted data for user authentication and/or other purposes. In still other examples, console 16 may receive, via I/O interface(s) 64, raw input data from HMD 12, and may invoke encryption engine 2 to encrypt the raw input data before forwarding the resulting cipher text to other devices using I/O interface(s) 64.

Figure 3B:
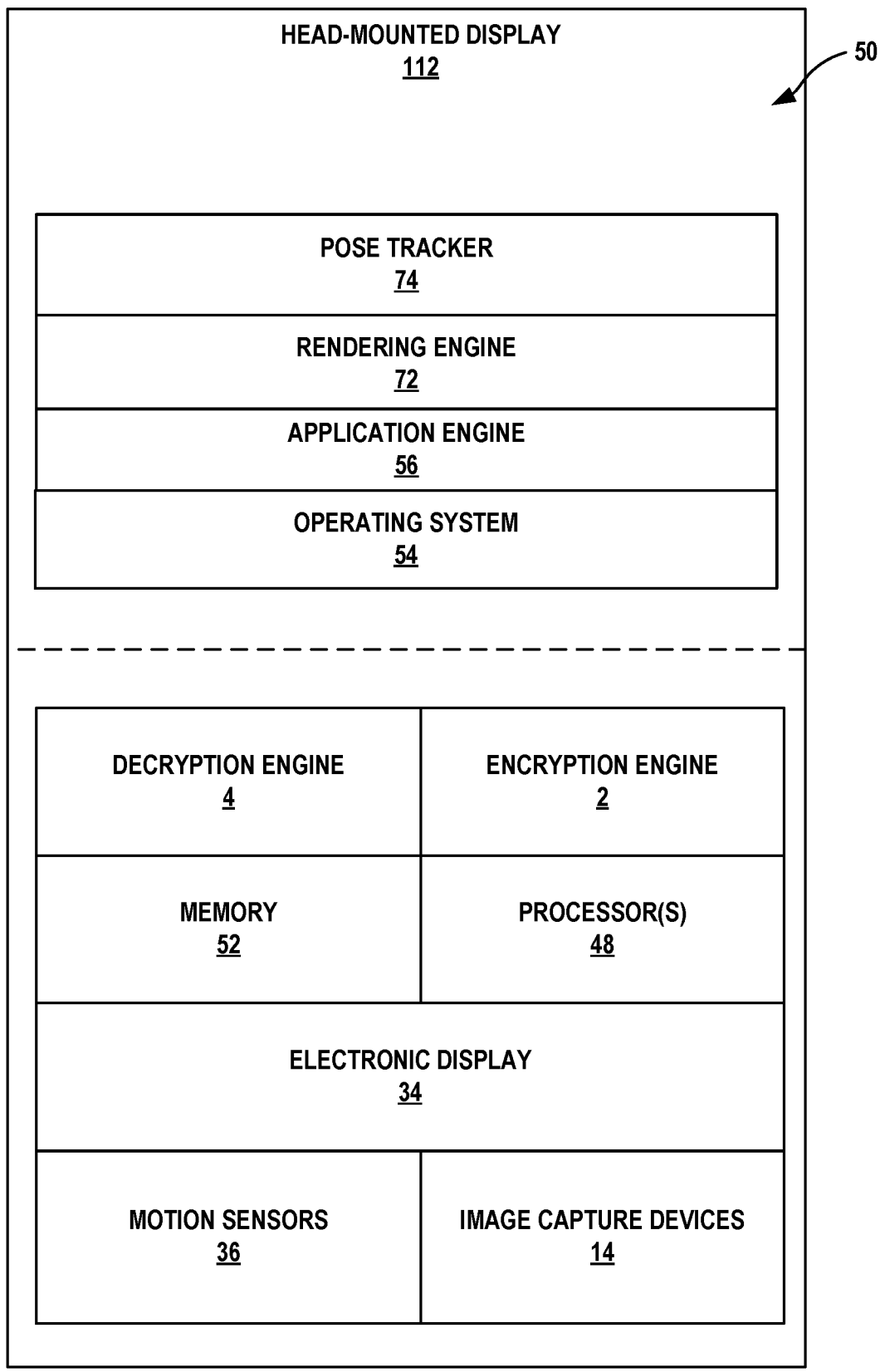

FIG. 3B is a block diagram depicting an example implementation of HMD 12 of artificial reality systems 10 & 20 of FIGS. 1A & 1B. In this example, as in the example of FIG. 3, HMD 12 includes one or more processors 48 and memory 52 that, in some examples, provide a computer platform for executing an operating system 54. Operating system 54 may represent an embedded, real-time multitasking operating system, for instance, or other type of operating system. Operating system 54 provides a multitasking operating environment for executing one or more software components 50. Moreover, processor(s) 48 are coupled to electronic display 34, motion sensors 36, and image capture devices 14.

In the example of FIG. 3B, software components 50 operate to provide an overall artificial reality application. In this example, software applications 50 include application engine 440, rendering engine 72, and pose tracker 74. In various examples, software components 50 operate in a similar manner to the similarly numbered counterpart components of FIG. 3A, in which these counterpart components are integrated into console 16. That is, software applications may construct the artificial content for display to user 24. In some examples, rendering engine 72 constructs artificial reality content 22 (e.g., 3D artificial reality content) which may be overlaid, at least in part, upon the real-world, physical environment in the FoV of user 24.

In the example of FIG. 3B, HMD 12 includes encryption engine 2 and decryption engine 4, which are described above with respect to FIGS. 1A-3A. For example, HMD 12 may receive encrypted data directly over network 18, or via an intermediate device, such as console 16, that may relay the encrypted data, in encrypted form, to HMD 12. In these examples, HMD 12 invokes decryption engine 4 to decrypt and reconstruct the encrypted data to obtain renderable data in the form of artificial reality content 22. In other examples, image capture devices 14 may capture facial images of people within the FoV of HMD 12 (using outward-facing camera hardware) and/or facial images or retina scans of user 24 (using inward-facing camera hardware), and may invoke encryption engine 2 to encrypt the image or scan data. In these examples, HMD 12 may transmit the encrypted data to another device, such as to peripheral device 42 using short-range communication infrastructure, or to a remote or cloud-based system, using a direct connection to network 18.

Figure 3C:
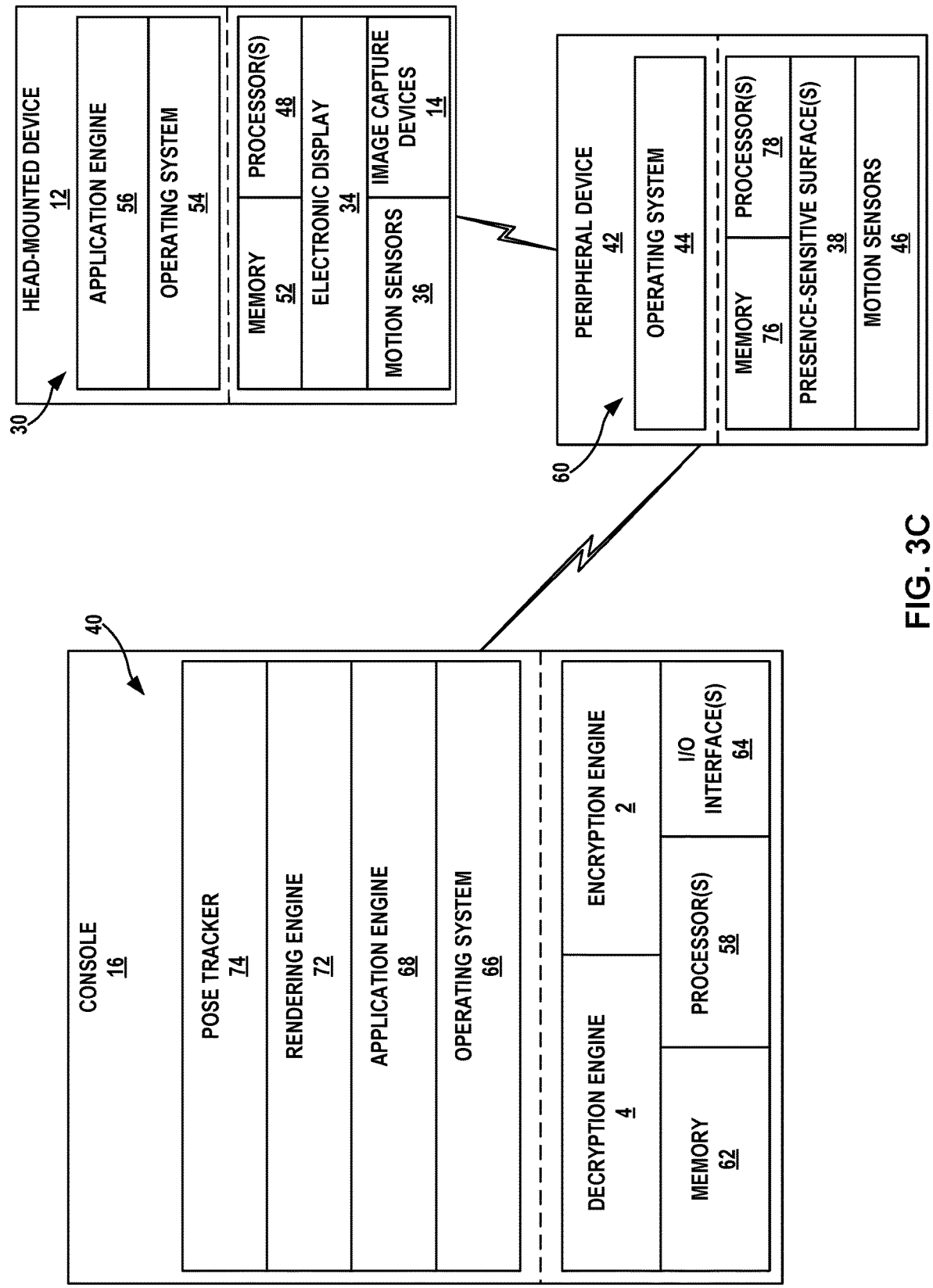

FIG. 3C is a block diagram depicting an example in which HMD 12 communicates with console 16 via peripheral device 42 shown in FIG. 2C. In the example of FIG. 3C, console 16 is configured to perform the SCA-resistant encryption and SCA-resistant decryption techniques of this disclosure. In the example of FIG. 3C, peripheral device 42 may offload portions of the computing tasks otherwise performed by HMD 12, thereby enabling a reduced hardware infrastructure and therefore a lower-profile form factor with respect to the design of HMD 12.

Peripheral device 42 includes motion sensors 46, presence-sensitive surface(s) 38 (which represent an example of surface 38 shown in FIG. 2C), memory 76, and one or more processors 78. Memory 76 and processor(s) 78 may collectively form control unit 32 illustrated in FIG. 2C. Software components 60 of peripheral device 42 include operating system 44, which provides a multitasking operating environment for software execution at peripheral device 42.

Figure 3D:
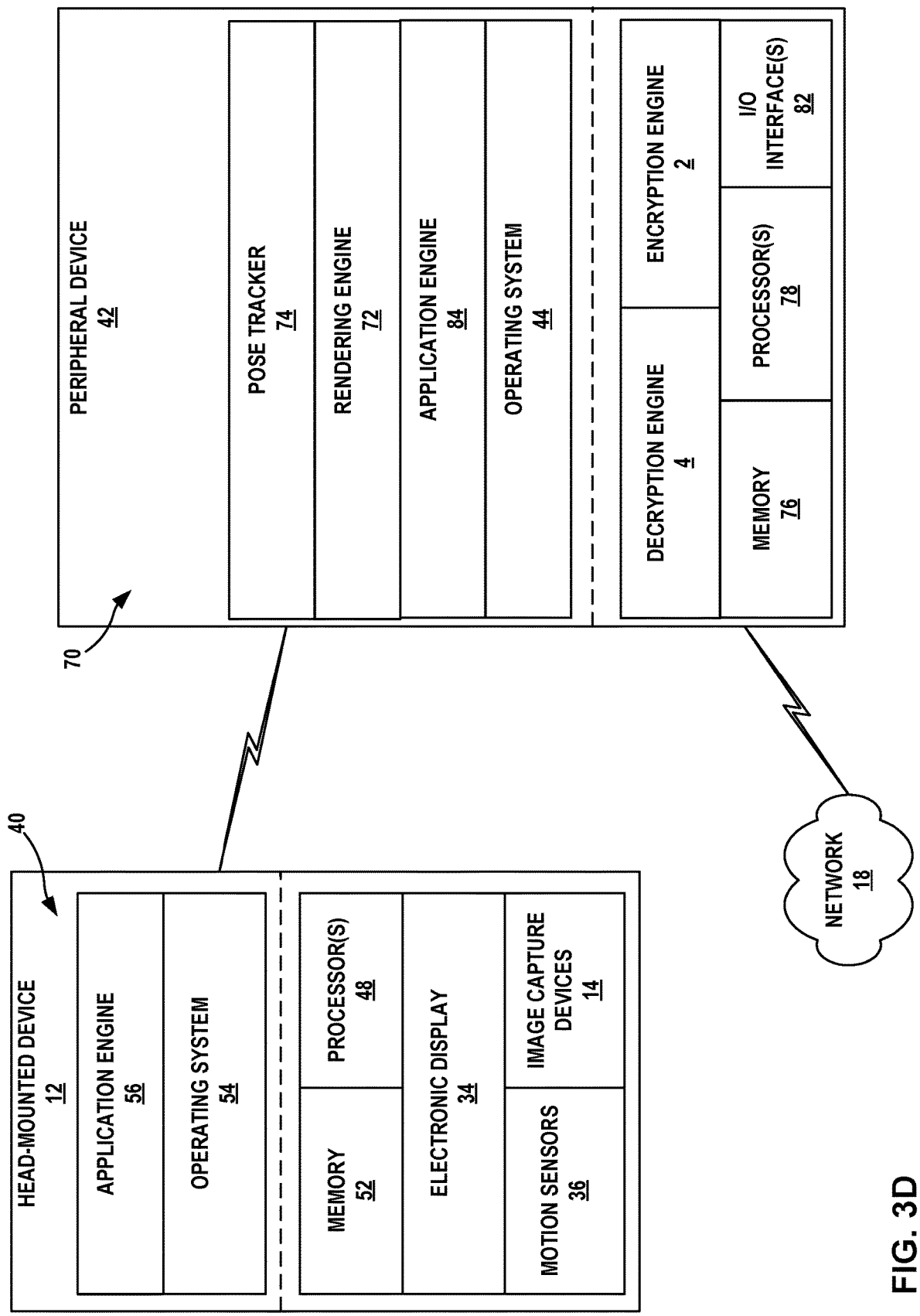

FIG. 3D is a block diagram depicting an example in which peripheral device 42 is equipped to perform the SCA-resistant encryption and SCA-resistant decryption techniques of this disclosure. In the example of FIG. 3D, peripheral device 42 includes the components illustrated in FIG. 3C, and also includes one or more I/O interfaces 96. I/O interface(s) may include presence-sensitive surface(s) 44 of FIG. 3C, in addition to other input and/or output devices and/or network interfaces.

In the example FIG. 3D, software components 70 of peripheral device 42 include application engine 84. Application engine 84 enables user 24 to view and interact with artificial reality content 22 for various end uses, such as for professional training, education, navigation, and the like. In the example illustrated in FIG. 3D, software components 70 of peripheral device 42 include operating system 44, application engine 84, rendering engine 72, and pose tracker 74.

In the example of FIG. 3D, peripheral device 42 includes encryption engine 2 and decryption engine 4. Peripheral device 42 may invoke decryption engine 4 in various use case scenarios, in response to varying stimuli. As one example, peripheral device 42 may invoke decryption engine 4 in response to receiving encrypted content (e.g. streaming video or gaming content) over network 18. In this example, peripheral device 42 may cause decryption engine 4 to decrypt the encrypted content received over network 18, and may cause rendering engine 72 to render the decrypted content to be output via electronic display 34 of HMD 12.

As another example, peripheral device 42 may invoke decryption engine 4 in response to receiving encrypted content (e.g. a facial image or an iris scan) from HMD 12, and may use the decrypted content for user authentication of user 24 or for facial recognition of other individuals positioned within the FoV of HMD 12. Peripheral device 42 may invoke encryption engine 2 in various use case scenarios, in response to varying stimuli, such as to encrypt raw input data received from HMD 12, thereby enabling one or more I/O interfaces 82 to transmit secure cipher text over network 18.

In the examples of FIGS. 3A-3D, encryption engine 2 and decryption engine 4 leverage signal path diversity introduced at non-linear computational stages of the pipelined encryption and pipelined decryption processes to randomly insert and propagate glitches to downstream computational stages. By randomly propagating glitches in the form of randomly unsynchronized signals to downstream computational stages, encryption engine 2 and decryption engine 4 cause the downstream computational stages perform random, unpredictable levels of switching in order to synchronize previously unsynchronized signals before processing operand pairs represented by the unsynchronized signal pairs. The random levels of switching introduced by encryption engine 2 and decryption engine 4 cause HMD 12 (or peripheral device 42 or console 16, as the cause may be) to exhibit erratic power traces, thereby providing hard-to-decipher inputs to SCA analyzers 6 and 8. In this way, encryption engine 2 and decryption engine 4 introduce misalignments into the power trace information that SCA analyzers 6 and 8 obtain to perform pre-processing steps upon which the remainder of the CPA processes are based.

According to the configurations of this disclosure, each of encryption engine 2 and decryption engine 4 incorporates combinatorial logic gates and sequential logic gates within respective non-linear computation stages. In examples in which encryption engine 2 is an AES-compliant unit, the non-linear computational stage of encryption engine 2 is referred to herein as a substitute byte (or Sbox) computational stage. In examples in which decryption engine 4 is an AES-compliant unit, the non-linear computational stage of decryption engine 4 is referred to herein as an inverse Sbox computational stage.

In AES-compliant scenarios, each Sbox unit of encryption engine 2 and each inverse Sbox unit of decryption engine 4 is configured such that the respective combinatorial logic gate set forms signal paths of varying signal traversal times. Each Sbox unit of encryption engine 2 and each inverse Sbox unit of decryption engine 4 incorporates sequential logic in the form of three bypassable latches, with one latch deployed in each signal path. Encryption engine 2 and decryption engine 4 each obtain a random bit sequence generated by a random number generator (RNG), which can be a true random number generator (TRNG), a deterministic random number generator (DRNG), or the like. Encryption engine 2 and decryption engine 4 select between activating or bypassing each latch of the overall set of bypassable latches based on a particular segment of bits taken from the random sequence that govern that particular latch.

By using a randomly generated bit sequence (or bitmap) to select between activating or bypassing each latch, encryption engine 2 and decryption engine 4 randomize the activation status (activated versus bypass) of each latch. By randomizing the activation status of each latch, encryption engine 2 and decryption engine 4 introduce signal path diversity on a random, unpredictable basis, in accordance with the techniques of this disclosure. In turn, downstream logic gates of the respective Sbox or inverse Sbox unit that use these randomly unsynchronized (or randomly synchronized) signals as operands perform random, unpredictable levels of switching in order to synchronize the signals before processing the signal pair.

For instance, the downstream logic gates may implement one of: (i) high switching in the case of a short signal path having an activated latch and a long signal path having a bypassed latch, (ii) intermediate switching in cases of both a short signal path and a long signal path having bypassed latches or both having activated latches, or (iii) minimal switching in the case of a short signal path having a bypassed latch and a long signal path having an activated latch. The minimal switching scenario represents an example of a randomly suppressed glitch, based on randomly synchronizing the signal pairs that provide operands to the downstream combinatorial logic. These random levels of switching within each Sbox unit or inverse Sbox unit enables encryption engine 2 and decryption engine 4 to introduce glitches on a random basis, thereby causing HMD 12 (or peripheral device 42 or console 16) to exhibit erratic power traces, thereby disrupting the power traces that SCA analyzers 6 and 8 attempt to align as a preprocessing step that is essential to executing a CPA successfully.

Figure 4:
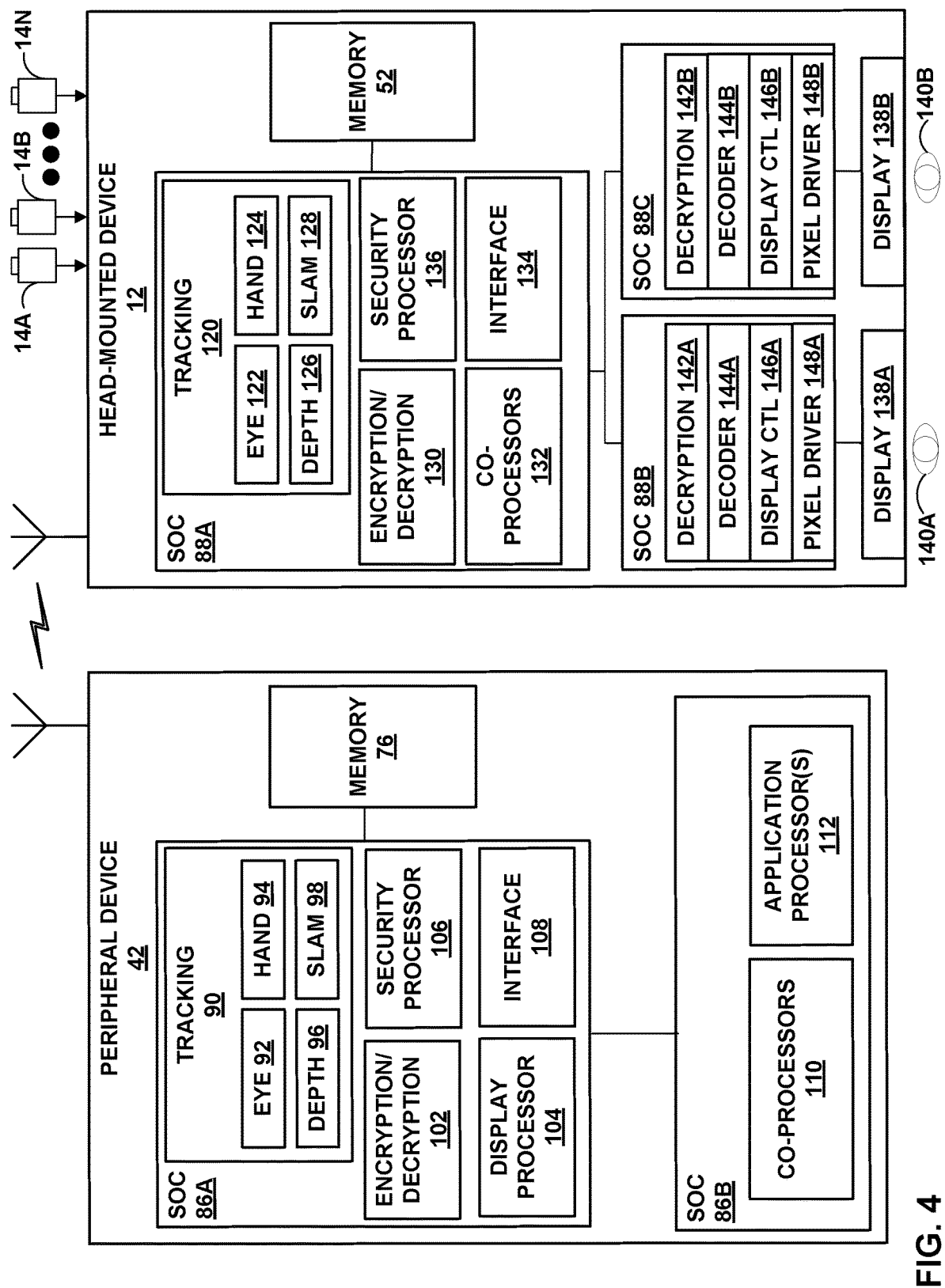
FIG. 4 is a block diagram illustrating a more detailed example implementation of a distributed architecture for a multi-device artificial reality system in which one or more devices are implemented using one or more system on a chip (SoC) integrated circuits within each device.

FIG. 4 is a block diagram illustrating a more detailed example implementation of a distributed architecture for a multi-device artificial reality system in which one or more devices are implemented using one or more SoC integrated circuits within each device. In some examples, artificial reality system 10 and/or artificial reality system 20 may include peripheral device 42 operating in conjunction with HMD 12, as described above with respect to FIGS. 2C, 3C, and 3D. Again, peripheral device 42 represents a physical, real-world device having a surface on which the artificial reality systems 10 or 20 overlay virtual content. Peripheral device 42 may include one or more presence-sensitive surfaces for detecting user inputs by detecting a presence of one or more objects (e.g., fingers, stylus) touching or hovering over locations of the presence-sensitive surface (e.g., presence-sensitive surface(s) 38).

In some examples, peripheral device 42 may include an output display, which may be a presence-sensitive display. In some examples, peripheral device 42 may be or have a form factor similar to a smartphone, a tablet computer, a personal digital assistant (PDA), or other hand-held device. In some examples, peripheral device 42 may be a smartwatch, smartring, or other wearable device. Peripheral device 42 may also be part of a kiosk or other stationary or mobile system. Peripheral device 42 may or may not include a display device for outputting content to a screen. As described, HMD 12 is architected and configured to enable concurrent execution of multiple artificial reality applications and collaborative scene rendering in accordance with techniques described in this disclosure.

In general, the SoCs illustrated in FIG. 4 represent a collection of specialized integrated circuits arranged in a distributed architecture, where each SoC integrated circuit includes various specialized functional blocks configured to provide an operating environment for artificial reality applications. FIG. 4 is merely one example arrangement of SoC integrated circuits. The distributed architecture for a multi-device artificial reality system may include any collection and/or arrangement of SoC integrated circuits.

In this example, SoC 88A of HMD 12 comprises functional blocks including tracking 120, an encryption/decryption unit 130, co-processors 132, security processor 136, and an interface 134. Encryption/decryption unit 130 may include encryption and decryption engines implemented separately in silicon. Tracking 120 provides a functional block for eye tracking 122 ("eye 122"), hand tracking 124 ("hand 124"), depth tracking 126 ("depth 126"), and/or Simultaneous Localization and Mapping (SLAM) 128 ("SLAM 128").

For example, HMD 12 may receive input from one or more accelerometers (e.g., quantities represented in inertial measurement units or "IMUs") that output data indicative of current acceleration of HMD 12, GPS sensors that output data indicative of a location of HMD 12, radar or sonar that output data indicative of distances of HMD 12 from various objects, or other sensors that provide indications of a location or orientation of HMD 12 or other objects within a physical environment. HMD 12 may also receive image data from one or more image capture devices 14A-14N (collectively, "image capture devices 14").

Image capture devices 14 may include various inward-facing and/or outward-facing image capture hardware, including one or more of still cameras, video cameras, laser scanners, Doppler® radar scanners, fundal photography hardware, infrared imaging hardware depth scanners, or the like, configured to output image data representative of the physical environment. Image capture devices 14 capture image data representative of objects (including peripheral device 42 and/or hand and/or the eyes of user 24) in the physical environment that are within a field of view of image capture devices, which typically corresponds with the viewing perspective of HMD 12 or the inward-facing view of HMD 12. Based on a portion of the sensed data and/or a portion of the image data, tracking 120 determines, for example, a current pose for the frame of reference of HMD 12 and, in accordance with the current pose, renders the artificial reality content.

Encryption/decryption unit 130 is a functional block to encrypt outgoing data communicated to peripheral device 42 or security server and decrypt incoming data communicated from peripheral device 42 or other system. Encryption/decryption unit 130 may include an encryption engine and a decryption engine implemented separately in silicon. In examples in which encryption/decryption unit 130 of HMD 12 includes encryption engine 2 and decryption engine 4, encryption/decryption unit 102 of peripheral device 42 includes an encryption engine and a decryption engine separate from encryption engine 2 and decryption engine 4.

Application co-processors 132 includes various processors such as a video processing unit, graphics processing unit, digital signal processors, encoders and/or decoders, and/or others. In accordance with the techniques described in this disclosure, all or portions of a backend shell may be in hardware, software, or a combination of hardware and software. For example, the backend shell of a concurrent application engine may be executed on co-application processors 132. A plurality of artificial reality applications may be concurrently executed on co-application processors 132.

Security processor 136 provides secure device attestation and mutual authentication of HMD 12 when pairing with devices, e.g., peripheral device 42, used in conjunction within the AR environment. Security processor 136 may authenticate SoCs 88A-88C of HMD 12.

Interface 134 is a functional block that includes one or more interfaces for connecting to functional blocks of SoC 88A. As one example, interface 134 may include peripheral component interconnect express (PCIe) slots. SoC 88A may connect with SoC 88B, 88C using interface 134. SoC 88A may connect with a communication device (e.g., radio transmitter) using interface 134 for communicating with other devices, e.g., peripheral device 42.

SoCs 88B and 88C each represent display controllers for outputting artificial reality content on respective displays, e.g., displays 138A, 138B (collectively, "displays 138"). In this example, SoC 88B may include a display controller for display 613A to output artificial reality content for a left eye 140A of user 24. For example, SoC 88B includes a decryption block 142A, decoder block 144A, display controller 146A, and/or a pixel driver 148A for outputting artificial reality content on display 138A. Similarly, SoC 88C may include a display controller for display 613B to output artificial reality content for a right eye 140B of user 24. For example, SoC 88C includes decryption unit 142B, decoder 144B, display controller 146B, and/or a pixel driver 148B for generating and outputting artificial reality content on display 138B. Displays 138 may include light-emitting diode (LED) displays, organic LEDs (OLEDs), quantum dot LEDs (QLEDs), electronic paper (E-ink) displays, liquid crystal displays (LCDs), or other types of displays for displaying digital content, such as artificial reality 22.

Peripheral device 42 includes SoCs 86A and 86B configured to support an artificial reality application. In this example, SoC 86A comprises functional blocks including tracking 90, an encryption/decryption unit 102, a display processor 104, an interface 108, and security processor 106. Tracking 90 is a functional block providing eye tracking 92 ("eye 92"), hand tracking 94 ("hand 94"), depth tracking 96 ("depth 96"), and/or simultaneous localization and mapping (SLAM) 98 ("SLAM 98"). For example, peripheral device 42 may receive input from one or more accelerometers (quantified in IMUs) that output data indicative of current acceleration of peripheral device 42, GPS sensors that output data indicative of a location of peripheral device 42, radar or sonar that output data indicative of distances of peripheral device 42 from various objects, or other sensors that provide indications of a location or orientation of peripheral device 42 or other objects within a physical environment. Peripheral device 42 may in some examples also receive image data from one or more image capture devices, such as still cameras, video cameras, laser scanners, Doppler® radar scanners, depth scanners, or the like, configured to output image data representative of the physical environment. Based on the sensed data and/or image data, tracking block 90 determines, for example, a current pose for the frame of reference of peripheral device 42 and, in accordance with the current pose, renders the artificial reality content to HMD 12.

Encryption/decryption unit 100 encrypts outgoing data communicated to HMD 12 or security server and decrypts incoming data communicated from HMD 12 or security server. Encryption/decryption unit 100 may include an encryption engine and decryption engine implemented separately in silicon. Encryption/decryption unit 132 may support symmetric key cryptography to encrypt/decrypt data using a session key (e.g., secret symmetric key). Display processor 104 includes one or more processors such as a video processing unit, graphics processing unit, encoders and/or decoders, and/or others, for rendering artificial reality content to HMD 12.

Interface 108 includes one or more interfaces for connecting to functional blocks of SoC 510A. As one example, interface 134 may include peripheral component interconnect express (PCIe) slots. SoC 86A may connect with SoC 86B using interface 134. SoC 86A may connect with one or more communication devices (e.g., radio transmitter) using interface 134 for communicating with other devices, e.g., HMD 12. Security processor 106 provides secure device attestation and mutual authentication of peripheral device 42 when pairing with devices, e.g., HMD 12, used in conjunction within the AR environment. Security processor 106 may authenticate SoCs 86A, 86B of peripheral device 42.

SoC 86B includes application co-processors 110 and application processors 112. In this example, co-application processors 110 includes various processors, such as a vision processing unit (VPU), a graphics processing unit (GPU), and/or central processing unit (CPU). Application processors 112 may include a processing unit for executing one or more artificial reality applications to generate and render, for example, a virtual user interface to a surface of peripheral device 42 and/or to detect gestures performed by a user with respect to peripheral device 42.

Figure 5:
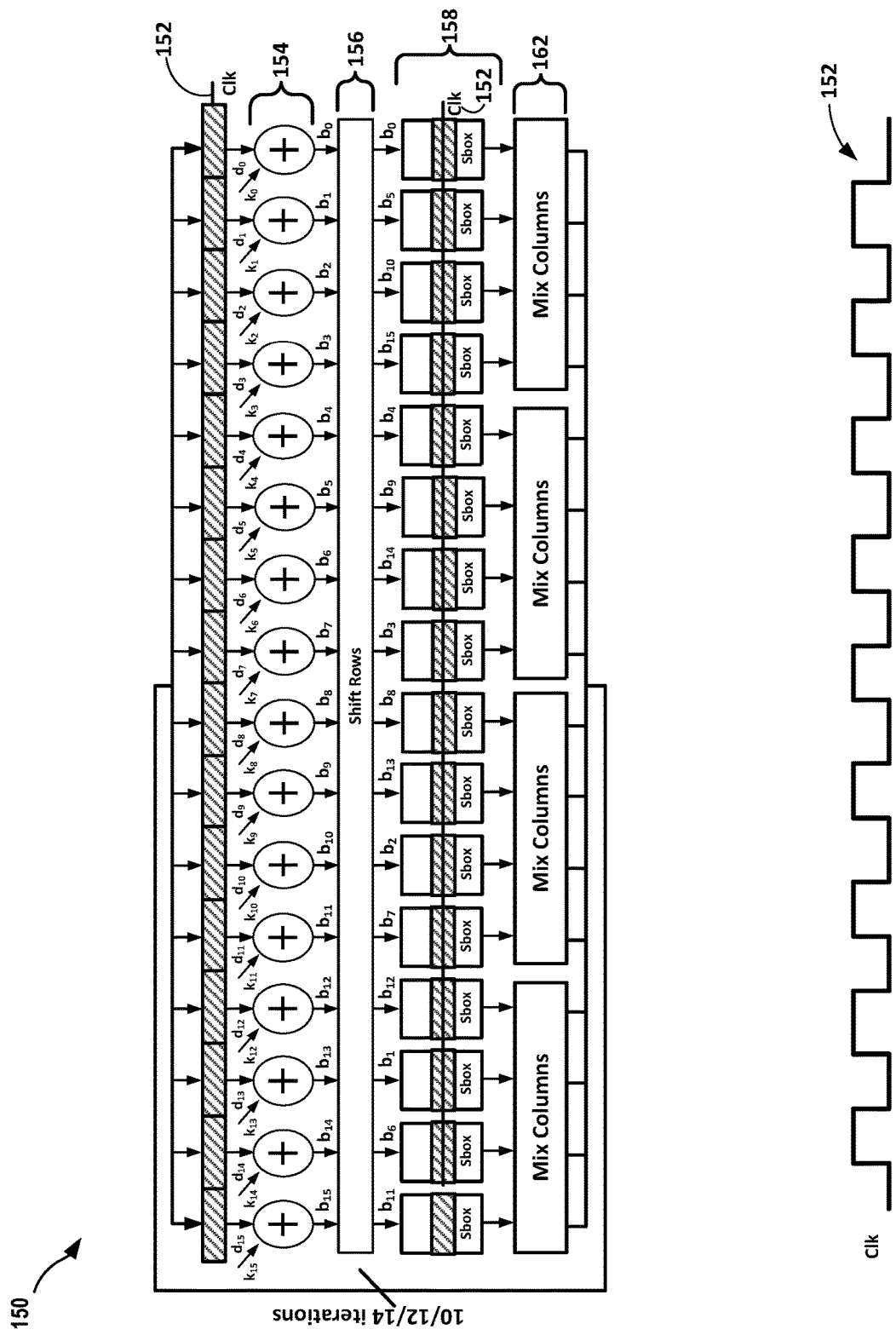
FIG. 5 is a conceptual diagram illustrating an example of AES-compliant encryption or decryption datapath.

FIG. 5 is a conceptual diagram illustrating an example of an AES-compliant encryption or decryption datapath. The process and structure illustrated in FIG. 5 is referred to herein as AES round datapath 150. An AES-compliant encryption engine may implement AES round datapath 150 to decrypt an input block of cipher text, by performing inverse operations with respect to a reciprocal encryption datapath that generates cipher text from unencrypted input data. Various aspects of AES round datapath 150 operate according to master clock 152. The clock rate of master clock 152 is described as being at a "full frequency" in the implementation illustrated in FIG. 5 to provide maximum decryption throughput with respect to decryption datapath 150. According to AES round datapath 150, a 16-byte (128-bit) encrypted input is provided, on a per-byte basis, to sixteen adder units as part of "add round key" step 154. In add round key step 154, each byte of the data input is added to an inverse cipher key obtained using Rijndael's key schedule. Each input byte-key pair is shown in FIG. 5 using a "d-k" notation, using subscripts to delineate the different input bytes and the different inverse cipher keys.

The sixteen output bytes (denoted using a "b" notation with unique subscripts) of add round key step 154 are then shifted cyclically by various offsets in a shift rows step 156. The shift rows step 156 cyclically shifts the bytes in each row by a certain offset determined for that particular row. In the shift rows step 156, the first row is left unchanged, each byte of the second row is right-shifted by an offset of one, each byte of the third row is right-shifted by an offset of two, and each byte of the fourth row is right-shifted by an offset of three. Thus, each column of the output data from shift rows step 156 includes shifted data from a column of the input data. The right-shifting operations described with respect to shift rows step 156 are generally reciprocal to left-shifting operations that are performed by a reciprocal AES-compliant encryption datapath.

The structure of the data output by the shift rows step 156 does not permit for independently operating on separate segments of the original 16-byte input, because data produced from four different block ciphers may be included in each four-byte run of the data output by the shift rows step 156. The shift rows step 156 is an iterative process that is performed in multiple passes, which, in the particular example of FIG. 5, is a ten-iteration step.

Each respective output byte of the shift rows step 156 is then passed through a respective inverse substitute byte (inverse Sbox) unit as part of inverse byte substitution computational stage 158. Decryption datapath 150 implements inverse byte substitution computational stage 158 by inverting a lookup table (LUT)-based substitution as a deciphering operation performed on the encrypted input data. In the reciprocal byte substitution step of an encryption datapath, each byte in the array output by a shift rows step is replaced with a substitute byte obtained using a LUT, which is also sometimes referred to as an 8-bit substitution box. Inverse byte substitution computational stage 158 addresses non-linearity in the cipher code received as input for AES round datapath 150.

The byte-substituted outputs of the sixteen inverse Sbox units are then provided to an array of mix columns units for performance of mix columns step 162. AES round datapath 150 includes four mix columns units, each of which receives, as input, the outputs of four contiguous inverse Sbox units. As such, each mix columns unit processes a four-byte input as part of mix columns step 162. In mix columns step 162, each mix columns unit combines the respective four-byte input using an invertible linear transformation. Each mix columns unit receives a four-byte input, and produces a four-byte output. Each four-byte input received by a respective mix columns unit is sometimes referred to as a respective "column" in the context of during mix columns step 162. Each mix columns unit of AES round datapath 150 processes the respective input column using matrix multiplication such that every single input byte affects all four output bytes. In a reciprocal encryption process, the combination of the reciprocal shift rows step and mix columns step provides diffusion in the cipher operation set.

An encryption datapath corresponding to decryption datapath 150 accepts a 16-byte (128-bit) block of unencrypted data, and adds cipher key segments (the cipher key being obtained using Rijndael's key schedule) to the unencrypted input, on a byte-by-byte basis during the corresponding "add round key" step. In a corresponding Sbox stage, the encryption datapath employs Sbox units, instead of inverse Sbox units described with respect to the decryption operations of AES round datapath 150. Purely for the sake of brevity, a separate AES encryption datapath is not illustrated in the accompanying drawings, in light of the structural parallels between the AES-compliant encryption datapath and the decryption-based AES round datapath 150 of FIG. 5.

Figure 6:
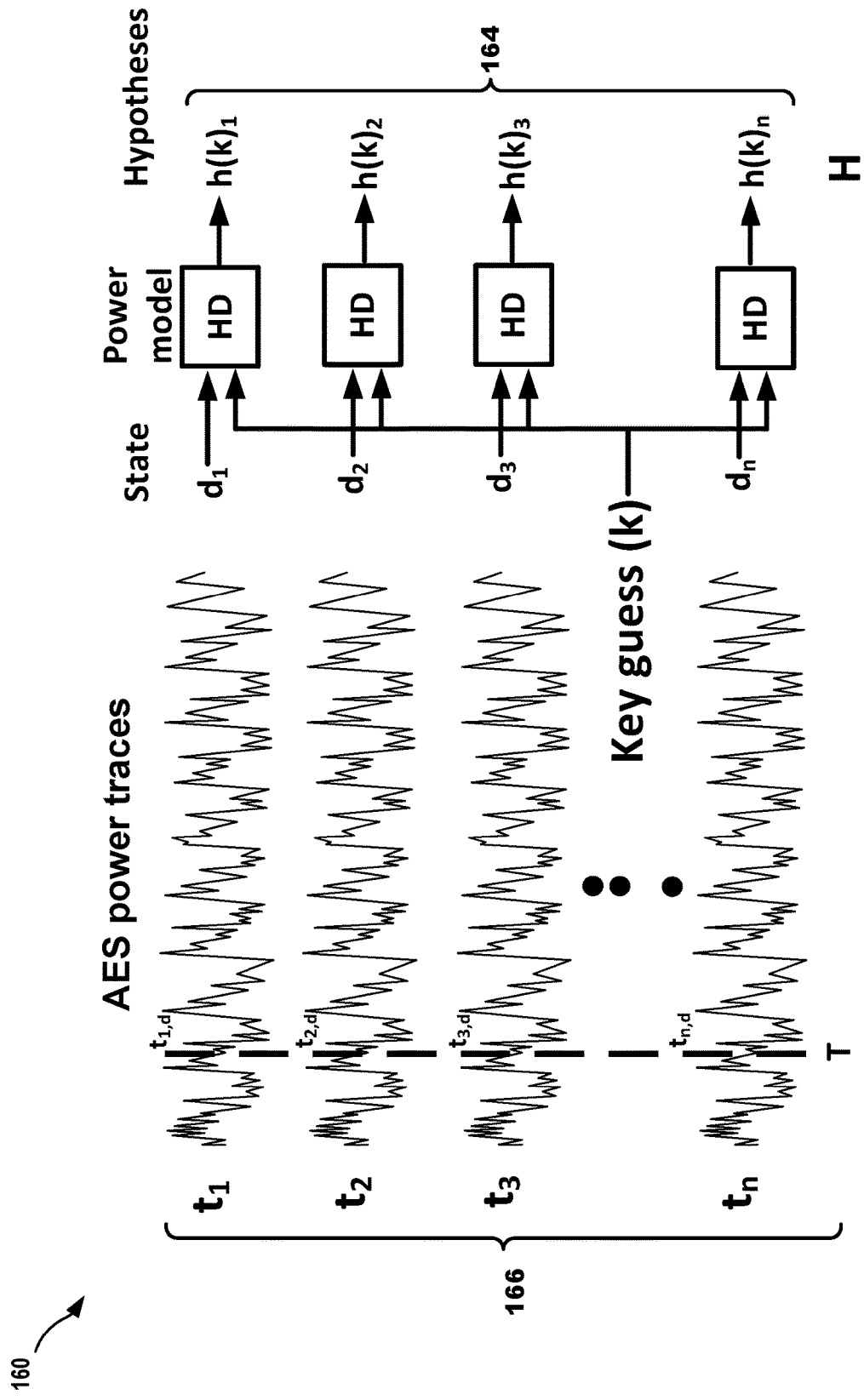
FIG. 6 is a conceptual diagram illustrating aspects of a correlation power attack (CPA).

FIG. 6 is a conceptual diagram illustrating aspects of a correlation power attack (CPA) 160. CPA 160 represents an attack that SCA analyzer 8 may perform. SCA analyzer 8 may provide a number of sixteen-byte test inputs to decryption engine 4, and snoop on the power traces exhibited by the device (e.g., HMD 12 or console 16) that implements decryption engine 4 while decrypting the test inputs. In many examples, SCA analyzer 8 provides one million test vectors in carrying out CPA 160.

SCA analyzer 8 maintains timestamps for the input times of the various test inputs to decryption engine 4. The timestamps that SCA analyzer 8 maintains for the full set of test inputs is illustrated in FIG. 6 as ti through tri where the subscript 'n' denotes the overall number of text inputs provided by SCA analyzer 8 (which is a value of one million in the case of many common SCA models). The underlying datasets of the respective test inputs are illustrated in FIG. 6 as $d_1$ through $d_n$. Using the respective timestamp t and the respective dataset d of a particular test input, SCA analyzer 8 conducts AES power traces 166. Again, because the AES is a publicly-available standard, potential hackers can configure SCA analyzer 8 to predict, for known input data, the expected power trace information relatively accurately.

Using datasets $d_1$ through $d_n$, SCA analyzer 8 generates key hypotheses $h(k)_1$ through $h(k)_n$ (collectively, hypotheses 164). That is, SCA analyzer 8 feeds datasets $d_1$ through $d_n$ into a key generation model. In the example of CPA 160, SCA analyzer 8 uses a hardware distance (HD) model to generate hypotheses 164 from datasets $d_1$ through $d_n$. SCA analyzer 8 also skims power traces 166 while each respective dataset d is processed by decryption engine 4. Because the data of each dataset d and the input time t of each dataset d is known to SCA analyzer 8, SCA analyzer 8 can match or determine likenesses between each AES power trace 166 and each of the 256 (calculated as 2^8 based on the 8-bit input) possible hypotheses 164.

The overall convergence of test inputs is denoted as 'T' in FIG. 6, and the overall convergence of hypotheses 164 is denoted as 'H'. SCA analyzer 8 uses the correlation of T and H (denoted as correlation (T, H)) to predict the inverse cipher key being applied in an AES-defined decryption process. In terms of key prediction, the particular hypothesis 164 that yields the highest correlation (T, H) value tends to be correct key guess in terms of the inverse cipher key being applied in the decryption process. In some notations, the correlation (T, H) value is expressed as a prediction operation R(k), and the correct key guess of the inverse cipher key is the greatest R(k) value obtained from the iterative power trace-to-predicted key comparison operation. That is, the particular hypothesis 164 that maximizes the value of R(k) within the universe of AES power traces 166 tends to be the correct key guess with respect to the AES-decryption process illustrated in FIG. 5 by way of AES round datapath 150.

Decryption engine 4 is configured according to aspects of this disclosure to randomize various characteristics of AES power traces 166, thereby causing SCA analyzer 8 to perform CPA 160 working from inaccurately calibrated data. Inverse byte substitution computational stage 158 is modified in decryption engine 4 to implement combinatorial logic gates and sequential logic gates, instead of using the AES-specified inverse lookup table ("inverse LUT") used for a non-linear computational stage of cipher text decryption.

According to aspects of this disclosure, decryption engine 4 implements forty eight (48) bypassable latches across inverse byte substitution computational stage 158. More specifically, each of the sixteen (16) inverse Sbox units of inverse byte substitution computational stage 158 includes three (3) latches (namely, three different four-bit (4-bit) latches), with one latch being deployed along a long signal path, and each of the two remaining latches being deployed along a respective short signal path. The long-path latch outputs a signal that downstream in-Sbox combinatorial logic uses in a respective signal pair with the respective signal output by each of the short-path latches.

Decryption engine 4 uses a random number generator (RNG) to generate a 192-bit random sequence, and maps a respective contiguous 4-bit sequence of the overall 192-bit sequence to each respective latch deployed across inverse byte substitution computational stage 158. Decryption engine 4 may designate one or more 4-bit sequences as "activation" sequences (e.g., homogenous sequences such as '1111' and/or '0000') and other 4-bit sequences as "bypass" sequences (e.g., heterogenous sequences that include at least one '1' bit and at least one '0' bit).

If a particular latch is assigned an activation sequence, decryption engine 4 activates that particular latch, causing the activated latch to throttle the signal being passed through the activated latch. Conversely, if decryption engine 4 determines that a particular latch is assigned a bypass sequence, decryption engine 4 disables that particular latch, causing the inactive latch to pass the input signal through, without adding any time lag to the signal. Depending on whether a given latch pair includes two randomly activated latches, two randomly disabled latches, or a combination of an activated and disabled latch, and depending on the logical length of the signal path in which each latch is positioned, decryption engine 4 provides randomly desynchronized or randomly synchronized signal pairs to a downstream (in-Sbox) multiplication unit. In cases of the signal pairs being randomly desynchronized, decryption engine 4 also randomizes the acuity or "skewness" of the asynchrony, depending on the two randomized criteria listed above.

In this way, decryption engine 4 leverages signal path diversity that occurs due to the non-linear nature of inverse byte substitution computational stage 158 to randomly insert glitches of varying magnitudes as well as to randomly suppress glitches in inverse byte substitution computational stage 158. By randomizing the latch operation across inverse byte substitution computational stage 158, decryption engine 4 disrupts the correlation between AES power traces 166 and the decryption operations presently being performed by decryption engine 4. In some use case scenarios, decryption engine 4 may attenuate the level of random glitch insertion by masking the 192-bit random sequence, based on various sensitivity factors of the inverse cipher key and/or of the data being decrypted that is presently under use. By attenuating the level of glitch insertion, decryption engine 4 may reduce the energy costs incurred by the resultant switching, while maintaining resistance to CPA 160.

While the configurations of this disclosure are described above primarily with respect to the decryption operations performed by decryption engine 4, it will be appreciated that encryption engine 2 is also configured to randomly insert glitches of varying magnitudes and to randomly suppress glitches within a byte substitution stage that is generally reciprocal to inverse byte substitution computational stage 158. Encryption engine 2 is implemented separately from decryption engine 4 in silicon, and uses a different RNG from the one used by decryption engine 4. In various instances, both, only one, or neither of encryption engine 2 and decryption engine 4 may attenuate the level of random glitch insertion, and may also implement differing levels of attenuation. In this way, encryption engine 2 and decryption engine 4 are configured to leverage signal path diversity may thwart encryption-based CPAs and CPA 160 (or other decryption-based CPAs) while maintaining data precision in terms of AES compliance with respect to the encrypted and decrypted data produced.

This disclosure primarily describes the glitch randomization techniques of this disclosure in the context of AES-compliant encryption and decryption. However, it will be appreciated that encryption engine 2 and decryption engine 4 may use the combinatorial and sequential logic of this disclosure to disrupt SCAs in examples in which encryption engine 2 and/or decryption engine 4 are configured to conform to other encryption standards, as well. For instance, encryption engine 2 and/or decryption engine 4 may encryption engine 2 and/or decryption engine 4 may append latches to LUT-based non-linear computational stages of other types of encryption/decryption datapaths. In these examples, encryption engine 2 and/or decryption engine 4 may randomize the operation of the appended latches using the RNG-based techniques of this disclosure to randomize the occurrence and levels of signal path diversity, and to therefore exhibit erratic power trace signatures.

Figure 7:
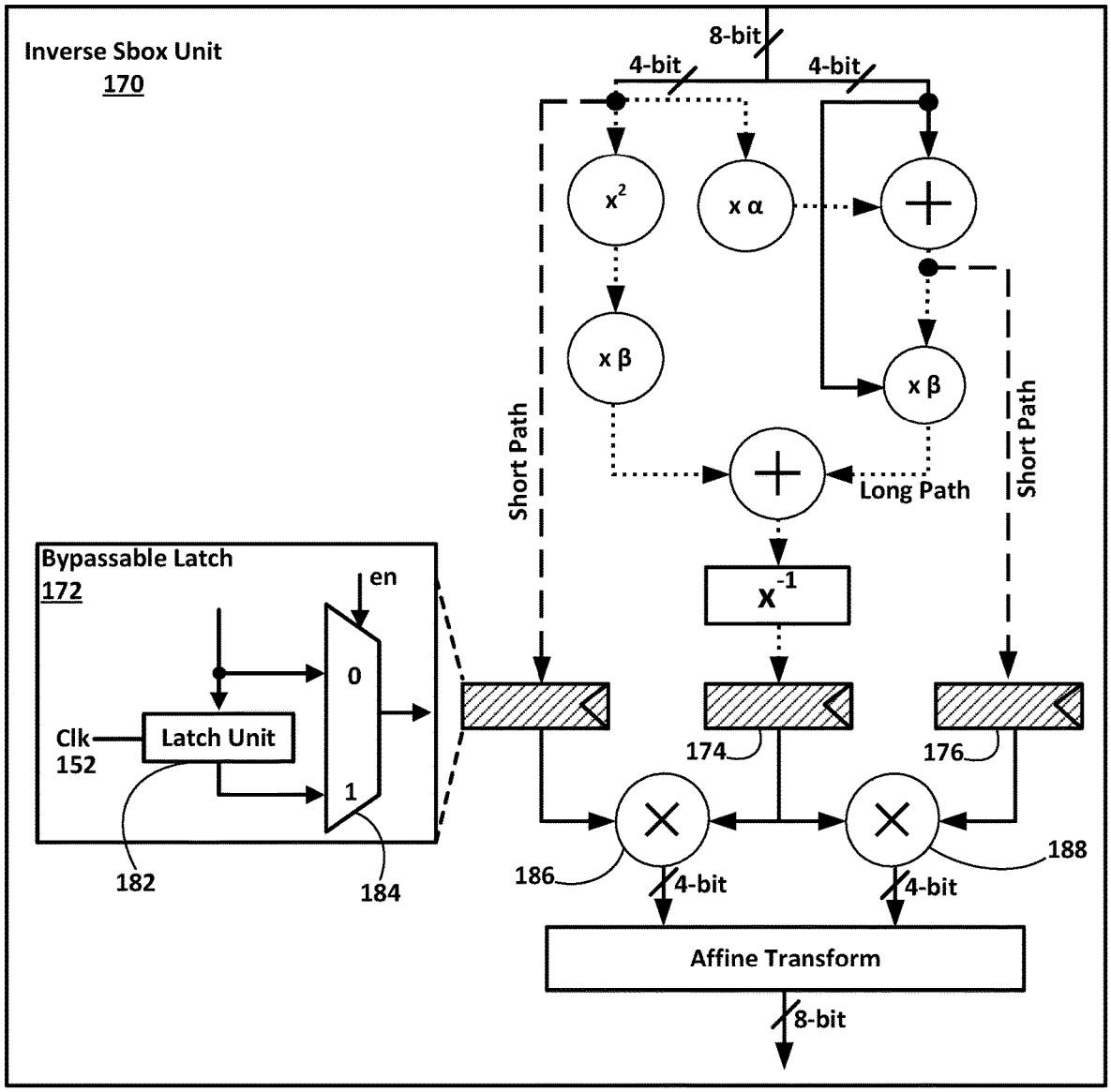
FIG. 7 is a block diagram illustrating an example inverse byte substitution (inverse Sbox) unit that implements glitch randomization techniques of this disclosure.

FIG. 7 is a block diagram illustrating an example inverse byte substitution (inverse Sbox) unit 170 that implements glitch randomization techniques of this disclosure. Inverse Sbox unit 170 represents one of an array of sixteen inverse Sbox units that collectively carry out inverse byte substitution computational stage 158 of FIG. 5. Each of the remaining fifteen inverse Sbox units shown in inverse byte substitution computational stage 158 of FIG. 5 may be configured similarly to inverse Sbox unit 170. The AES specifies a LUT-based series of byte substitution operations, as described above. According to aspects of this disclosure, inverse Sbox unit 170 implements combinatorial and sequential logic, instead of using a LUT, to perform byte substitution in inverse byte substitution computational stage 158.

According to AES round datapath 150, all signals to undergo an equal number of switching events and interconnect traversals before reaching inverse Sbox unit 170. As such, AES round datapath 150 does not exhibit signal asymmetry until the inverse substitute byte computational stage 158 is invoked. Decryption engine 4 is configured according to this disclosure to leverage the non-linear nature of inverse substitute byte computational stage 158 to cause random glitching of varying magnitudes, or to randomly suppress glitches. Decryption engine 4 is configured such that pipelining register infrastructure is relocated from other parts of decryption engine 4 into inverse Sbox unit 170 to provide inverse Sbox unit 170 with internal sequential logic. The relocated sequential logic comprises bypassable latches.

By including bypassable latches in inverse Sbox unit 170 and the remaining fifteen inverse Sbox units of inverse byte substitution computational stage 158, decryption engine 4 implements the configurations of this disclosure to relocate existing latch invocation at the origination points of signal asymmetry. Inverse Sbox unit 170 randomizes the operation of multiple latches on a latch-by-latch basis to randomize the level of switching that downstream combinatorial logic performs in order to stabilize signal pairs before using the signal pairs as operands. By randomizing the switching performed by the downstream logic, inverse Sbox unit 170 randomizes the power trace information that SCA analyzer 4 uses as a preprocessing prerequisite in carrying out CPA 160, and inverse Sbox unit 170 (in conjunction with the fifteen remaining inverse Sbox units) enables decryption engine 4 to perform decryption in an SCA-resistant manner.

The glitch randomization techniques of this disclosure enable inverse Sbox unit 170 to randomly insert transient signal swings between clock cycles. These transient signal swings cause downstream components receiving asymmetric signal pairs to perform switching. Again, by randomizing the occurrence and magnitude of the signal swings, and thereby, the downstream switching, inverse Sbox unit 170 (as well as the fifteen remaining inverse Sbox units of decryption engine 4) obfuscate or obscure the power trace signature of the device (e.g., HMD 12) that includes decryption engine 4, thereby thwarting or potentially preventing CPA 160.

Inverse Sbox unit 170 includes bypassable latches 172-176, in accordance with the configurations of this disclosure. Inverse Sbox unit 170 randomizes the activation status of each of bypassable latches 172-176, on a latch-by-latch basis, by assigning a respective 4-bit sequence taken from a randomly generated bitmap to each of bypassable latches 172-176, and activating or bypassing each of bypassable latches 172-176 based on whether the assigned 4-bit sequence matches a predefined activation sequence or a predefined bypass sequence, respectively. Because each of bypassable latches 172-176 is randomly activated or disabled on an individual basis, inverse Sbox unit 170 has available six (calculated as "3!" or "three factorial") possible status combinations between the three latches represented by bypassable latches 172-176.

The overall combinatorial and sequential logic of Inverse Sbox unit 170 is configured to randomly pipeline signals such that operand signal pairs are received at certain subcomponents at randomly variant or randomly synchronized times. By randomizing the times at which input signal pairs arrive at various individual subcomponents within inverse Sbox unit 170, inverse Sbox unit 170 randomizes the levels of switching activity performed at the individual subcomponents in order to counteract the latency caused by input signal asymmetry (which may be none in the case of randomly symmetrized input signals).

Purely for the purpose of ease of illustration, not all of the subcomponents of inverse Sbox unit 170 are assigned individual reference numerals in FIG. 7. As one example, inverse Sbox unit 170 receives an 8-bit (1-byte) input. Inverse Sbox unit 170 bifurcates the 8-bit input into two 4-bit words, as shown in FIG. 7. Each 4-bit word is pipelined separately, with a different set of operations being performed in each pipeline. The first 4-bit word is first raised exponentially to a power of two by a squaring unit, and the squared result is supplied to a first multiplier that uses a constant 'β' as a multiplier. The first 4-bit word is also supplied to a second multiplier that uses a constant 'α' as a multiplier.

The second 4-bit word is supplied to a first adder that adds the second 4-bit word to the output of the second multiplier discussed above. The second 4-bit word is also supplied to a third multiplier that multiplies the second 4-bit word with the output of the first adder. In turn, the outputs of the first multiplier and the third multiplier are supplied to a second adder, and the output of the second adder is supplied to an inverter. The inverter output is supplied to bypassable latch 174.

Also, as shown in FIG. 7, the first 4-bit word is supplied to bypassable latch 172, and the output of the first adder is supplied to bypassable latch 176. As measured from the bifurcation point of the original 8-bit input into the first and second 4-bit words, the inputs to bypassable latches 172 and 176 traverse a shorter logical path than the input to bypassable latch 174. More specifically, the input to bypassable latch 172 is provided directly from the bifurcation point, and the input to bypassable latch 176 traverses two logic elements (the second multiplier and the first adder) before reaching bypassable latch 176.

In contrast, the input to bypassable latch 174 traverses a longer logical path than the other two inputs described above, because the input to bypassable latch 174 passes through seven logic elements, several of which are arranged in series. The short path traversals from the original bifurcation point to bypassable latches 172 and 176 are shown in FIG. 7 using dashed lines, while the long path traversal from the original bifurcation point to bypassable latch 174 is shown in FIG. 7 using dotted lines. In turn, each of bypassable latches 172-176 provides its respective output to one or both of multiplication units 186 and 188.

More specifically, as shown in FIG. 7, multiplication unit 186 receives the outputs of bypassable latches 172 and 174 as inputs, and generates a 4-bit product by multiplying the two inputs. Similarly, multiplication unit 188 receives the outputs of bypassable latches 174 and 176 as inputs, and generates a 4-bit product by multiplying the two inputs. Multiplication units 186 and 188 supply their respective outputs to an affine transform unit, which generates an 8-bit substituted output.

As shown, each of multiplication units 186 and 188 uses the long path-traversed output of bypassable latch 174 as one operand, and a respective short path-traversed output (of one of bypassable latches 172 or 176) as the other operand. For this reason, each respective input pair to each of multiplication units 186 and 188 exhibit signal asymmetry, because each respective pair of inputs is split between a respective short path and the lone long path from the bifurcation point to the respective multiplication unit 186 or 188.

Each of bypassable latch pairs 172-174 and 174-176 is configured to introduce signal path diversity of varying magnitudes or to synchronize signals on a random basis, according to aspects of this disclosure. By randomizing input signal asymmetry and symmetry at multiplication units 186 and 188, bypassable latch pairs 172-174 and 174-176 cause multiplication units 186 and 188 to perform random amounts of switching (or in some cases, little to no switching) to process each received signal pair. Different amounts of switching activity consume different quantities of energy, thereby randomizing the power trace signatures output by HMD 12 (or other device that implements decryption engine 4 in silicon). Inverse Sbox unit 170 may also propagate signal asymmetry-based glitches to the respective downstream mix columns unit, causing additional random power traces to emanate from the downstream mix columns unit.

A controller coupled to inverse Sbox unit 170 randomly activates or bypasses bypassable latches 172-176 based on a trio of 4-bit random sequences, each 4-bit random number being assigned to a respective latch of bypassable latches 172-176. If one of the 4-bit random sequences matches a predefined activation sequence (e.g., '1111' or '0000' in different scenarios), that particular latch of bypassable latches 172-176 is activated. The activated latch throttles the signal received by the respective latch before relaying the signal to the downstream multiplication unit 186 and/or 188. Conversely, if one of the 4-bit random sequences matches a predefined bypass sequence (e.g., one or more of '1010', '0101', '0011', '1100', etc. in various scenarios), that particular latch of bypassable latches 172-176 is disabled. The disabled latch is bypassed, in that the disabled latch relays the received input signal to the downstream multiplication unit 186 and/or 188 without adding any further time lag to the signal traversal.

Components of bypassable latches 172-176 are illustrated in FIG. 7 by way of the example of bypassable latch 172. Bypassable latch 172 includes a latch unit 182 and a multiplexer (MUX) 184. MUX 184 is a 2:1 MUX, and receives two inputs, namely, the input signal received directly along the upstream short path, and the same input signal after being held and relayed in a level-triggered manner by latch unit 182. In instances in which bypassable latch 172 is assigned a bypass sequence, MUX 184 toggles to selection input '0', thereby selecting the direct input signal and bypassing latch unit 182. In this way, inverse Sbox unit 170 operates bypassable latch 172 in a random bypass scenario to relay the received input signal to multiplication unit 186 without adding the level-triggered delivery associated with latch activation. In this way, each of bypassable latches 172-176 can function as a transparent latch, because each of bypassable latches 172-176, when disabled, directly relays the received input signal downstream, and when activated, holds and releases the received signal downstream in a level-triggered manner.

If bypassable latch 172 is assigned an activation sequence, MUX 184 toggles to selection input '1', thereby selecting the level-triggered input signal delivered from latch unit 182. In this way, inverse Sbox unit 170 operates bypassable latch 172 in a random active scenario to relay the received input signal to multiplication unit 186 with the level-triggered delivery added by latch unit 182. Each of bypassable latches 174 and 176 is constructed and configured similarly to bypassable latch 172. Bypassable latch 174 feeds its output signal to both multiplication unit 186 and multiplication unit 188, while bypassable latch 176 feeds its output signal only to multiplication unit 188.

In instances in which both of bypassable latches 172 and 174 are randomly disabled, multiplication unit 186 receives moderately asynchronous signals, and performs a moderate level of switching to stabilize the moderately asynchronous signals. This is because the bypassing bypassable latches 172 and 174 make no change to the level of signal asymmetry introduced by the logical distance difference between the short path traversal and long path traversal. In instances in which bypassable latch 172 is randomly disabled and bypassable latch 174 is randomly activated, multiplication unit 186 receives acutely asynchronous signals, and performs a high level of switching. This is because the activation of bypassable latch 174 adds the temporary storage with level-triggered relay to the input signal of bypassable latch 174 while bypassable latch 172 is bypassed, causing a direct relay of its input signal to multiplication unit 186, further skewing or exacerbating the already diverse input signals to increase the level of signal path diversity.

In instances in which bypassable latch 172 is randomly activated and bypassable latch 174 is randomly disabled, multiplication unit 186 receives acutely asynchronous signals, and performs a high level of switching. This is because the activation of bypassable latch 172 adds the temporary storage with level-triggered relay to the input signal of bypassable latch 172 while bypassable latch 174 is bypassed, causing a direct relay of its input signal to multiplication unit 186, further skewing or exacerbating the already diverse input signals to increase the level of signal path diversity. In instances in which both of bypassable latches 172 and 174 are randomly activated, multiplication unit 186 receives synchronized signals, and performs little to no switching. This is because the activation of both of bypassable latches 172 and 174 causes both of bypassable latches 172 and 174 to store and release their respective input signals in a level-triggered way, thereby synchronizing the two output signals relayed to multiplication unit 186.

In this way, decryption engine 4 randomizes the operation of bypassable latches 172-176 to cause any possible combination of three different levels of switching across two multiplication units (a total of six possible combinations), thereby obfuscating the power trace signature of inverse Sbox unit 170 in a potentially different way at each clock cycle. Moreover, decryption engine 4 implements the same level of randomization across the remaining fifteen inverse Sbox units of inverse byte substitution computational stage 158, causing even further disruption between the power trace signature of decryption engine 4 and the inverse cipher key presently being used for decryption. In this way, decryption engine 4 implements the glitch randomization techniques of this disclosure to disrupt AES power traces 166, thereby causing SCA analyzer 8 to perform CPA 160 from an inaccurately performed preprocessing step, and in turn thwarting or foiling CPA 160. That is, SCA analyzer 8 performs the preprocessing stem inaccurately, because AES power traces 166 are disrupted by decryption engine 4, according to the glitch randomization techniques of this disclosure.

Encryption engine 2 may include, in its byte substitution computational stage, sixteen Sbox units configured similarly to inverse Sbox unit 170 of decryption engine 4. By implementing glitch randomization across the byte substitution computational stage of the pipelined encryption datapath, encryption engine 2 may disrupt the correlation between the encryption-based power trace signature of HMD 12 (or peripheral device 42 or console 16, as the case may be) and the cipher key being used at present for encryption. That is, encryption engine 2 may obscure or obfuscate AES power traces upon which SCA analyzer 6 relies in performing a CPA that is analogous to the decryption-based attack represented by CPA 160. In this way, both encryption engine 2 and decryption engine 4 are configured according to this disclosure to randomly insert glitches of varying magnitudes (or to randomly suppress glitches in some scenarios) to improve data security while maintaining data precision by way of AES compliance.

Figure 8:
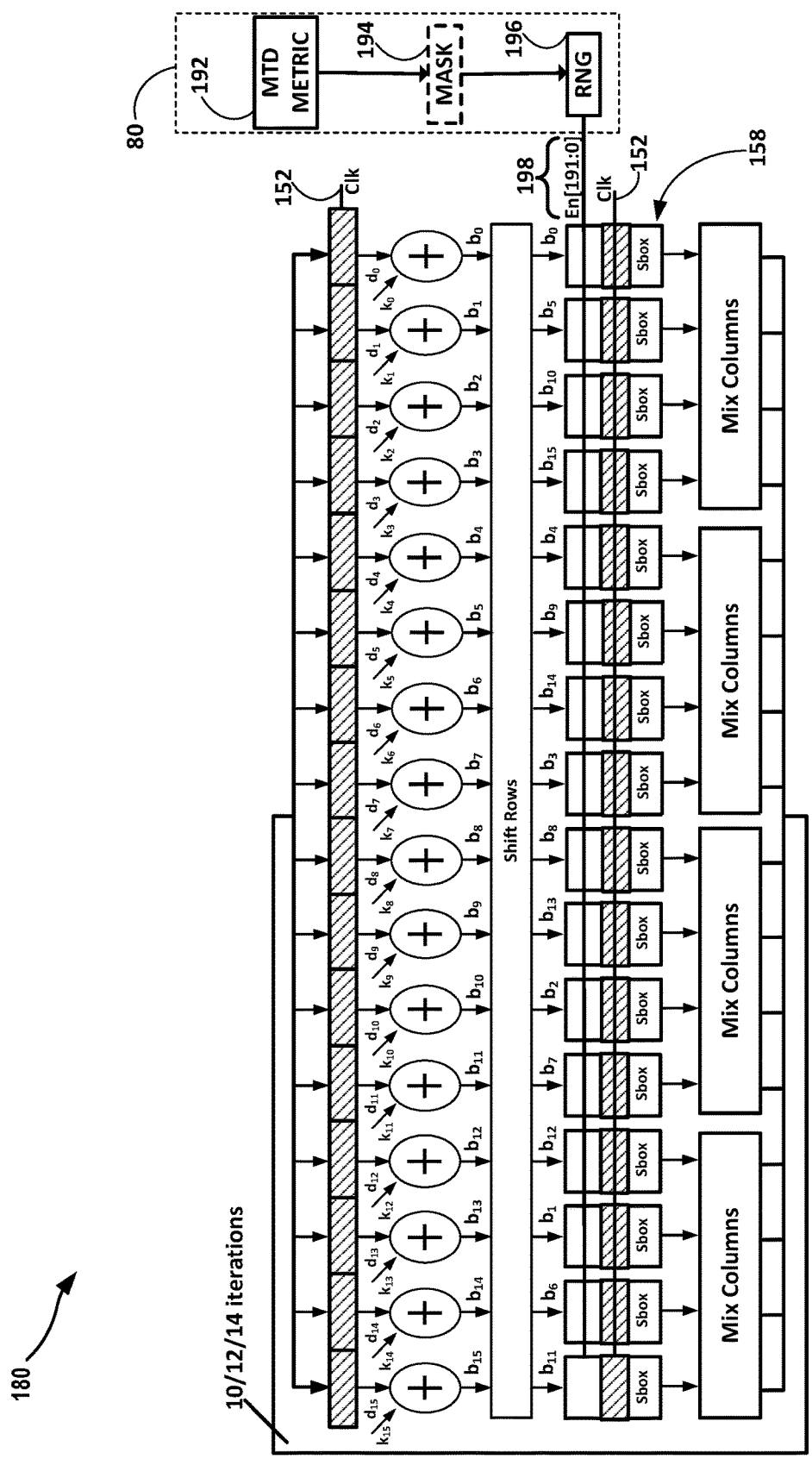
FIG. 8 is a conceptual diagram illustrating an example glitch-randomized decryption datapath of this disclosure.

FIG. 8 is a conceptual diagram illustrating glitch-randomized decryption datapath 180. Decryption engine 4 implements glitch-randomized decryption datapath 180 of FIG. 8 to thwart CPA 160 by randomly suppressing glitches and randomly inserting glitches of varying acuities in the non-linear computational stage represented by inverse byte substitution computational stage 158. In the example of glitch-randomized decryption datapath 180, decryption engine 4 tunes parameters of the glitch randomization based on one or more characteristics of the inverse cipher key being used at present for decryption.

In the example of glitch-randomized decryption datapath 180, decryption engine 4 tunes the glitch randomization at inverse byte substitution computational stage 158 based on a "mean time to disclosure" (MTD) metric 192 associated with the inverse cipher key being applied at present. MTD metric 192 of a given key is directly proportional to the amount of key information that is being leaked via AES power traces 166, and is indicative of an average length of time (based on various hypotheses or test data) that CPA 160 will have to execute before correctly guessing the inverse cipher key being used by decryption engine 4. In some examples, an administrator may provide MTD metric 192 as an input to HMD 12 or other device that includes or otherwise controls the operation of decryption engine 4. In some examples, MTD metric 192 may be determined based on simulations run for one, some, or all of the inverse Sbox units included in inverse byte substitution computational stage 158.

MTD metric 192 may vary based on various sensitivity-based parameters relating to the inverse cipher key presently being applied by decryption engine 4, such as, but not limited to, the lifespan of the inverse cipher key, the asset(s) under protection via encryption, the interest in attacks such as CPA 160, how commonly the same inverse cipher key is used across various devices (e.g., commercially available devices), SoCs (e.g., commercially available SoCs), etc. In some examples, MTD metric 192 may be determined based on one or more SCA simulations run for one or more subsets of inverse Sbox units of inverse byte substitution stage 158, or of inverse Sbox units that serve as simulators for one or more subsets of inverse Sbox units of inverse byte substitution stage 158.

In cases of low or very low values of MTD metric 192, decryption engine 4 may identify a heightened need for SCA-resistance. Conversely, in cases of greater values for MTD metric 192, decryption engine 4 may identify a diminished need for SCA-resistance measures. If decryption engine 4 identifies a diminished need for SCA-resistance measures, decryption engine 4 may invoke bitmask unit 194. Bitmask unit 194 is illustrated using dashed-line borders, to indicate the optional invocation of bitmask unit 194 in the SCA-mitigation measures of this disclosure. In instances of diminished needs for SCA-resistance measures (e.g., based on the presently used inverse cipher key being an ephemeral key with a short lifespan, the asset(s) under protection being of less interest to potential attackers, etc.), bitmask unit 194 may provide a bitmask of '1' bits or '0' bits (depending on whether the predefined activation sequence used by decryption engine 4 is a series of '1' bits or a series of '0' bits) to random number generator (RNG) 196. The bitmask provided by bitmask unit 194 potentially reduces the amount of glitching introduced in glitch-randomized decryption datapath 180 to reduce energy consumption, in instances in which the security needs are of reduced acuity.

RNG 196 is configured to generate a random bit sequence 198 (which, in this example, is a 192-bit random sequence or bitmap). Decryption engine 4 (or components that include decryption engine 4, such as control unit 32) may modulate various aspects of the random bit sequence generation, based on various sensitivity level factors pertaining to the inverse cipher key currently being used and/or the protected asset(s) currently being decrypted.

RNG 196 and bitmask unit 194 are shown in FIG. 8 as being included in a controller 80. In the example of FIG. 8, controller 80 also includes components to obtain or generate MTD metric 192. As such, various functionalities ascribed to RNG 196 and bitmask unit 194, as well as various functionalities associated with MTD metric 192 are described as being performed by controller 80. Controller 80 represents hardware or hardware implementing software to control bypassable latches deployed in inverse byte substitution computational stage 158, such as bypassable latches 172-176 of inverse Sbox unit 170. Controller 80 is implemented in silicon, and may include, be, or be part of portions of decryption engine 4 and/or portions of control unit 32.

If controller 80 determines that the current decryption operations have a lower sensitivity level, controller 80 may invoke bitmask unit 194 to generate a bitmask. Controller 80 may apply the bitmask to the random bit sequence 198 generated by RNG 196 to reduce the number of 4-bit activation sequences included in random bit sequence 198. By reducing the number of activation sequences included in random bit sequence 198 (that is, the 192-bit random sequence in this example), controller 80 enables decryption engine 4 to implement the glitch-randomization techniques of this disclosure, thereby implementing the SCA-resistance measures of this disclosure, while reducing energy consumption incurred by unmodulated levels of glitch insertion. Bitmask unit 194 may be configured to perform variant levels of masking, in response to different sensitivity level inputs received from controller 80, and based on the value of MTD metric 192.

In some examples, controller 80 may modulate the frequency at which RNG 196 generates new instances of random bit sequence 198 (e.g., new 192-bit random sequences), or "renews" random bit sequence 198. For example, in a low sensitivity scenario, controller 80 may case RNG 196 to generate a new instance of random bit sequence 198 after multiple cycles of master clock 152. As another example, in a high sensitivity scenario, controller 80 may cause RNG 196 to generate a new instance of random bit sequence 198 at every cycle of master clock 152. In some examples, regardless of the frequency at which RNG 196 generates a new instance of random bit sequence 198, RNG 196 may generate a new instance of random bit sequence 198 by toggling every bit of the previous instance of random bit sequence 198 (which in this example is the previously used 192-bit random sequence).

Two examples are described below in which controller 80 provides sensitivity level inputs based on the lifespan of the inverse cipher key currently being applied. In one of these examples, controller 80 may not invoke bitmask unit 194 based on decryption engine 4 using a permanent (or constant) inverse cipher key, and may cause RNG 196 to renew random bit sequence 198 at every cycle of master clock 152. In another of these examples, controller 80 may invoke bitmask unit 194 to perform some level of masking based on decryption engine 4 using a temporary (or ephemeral) inverse cipher key, and may cause RNG 196 to renew random bit sequence 198 at multiple cycles passes of master clock 152.

As shown by and described with respect to glitch-randomized decryption datapath 180, decryption engine 4 implements the techniques of this disclosure to operate in a random manner as opposed to a deterministic manner, thereby causing HMD 12 to exhibit erratic power traces. By randomizing the status of forty-eight bypassable latches across sixteen inverse Sbox units of inverse byte substitution computational stage 158 between being active/operational and bypass/open/transparent, decryption engine 4 disrupts the power trace information upon which SCA analyzer 8 relies to perform SCAs, such as CPA 160.

Encryption engine 2 is also configured to perform glitch-randomization techniques of this disclosure in the context of encryption operations, such as by deploying bypassable latches in a byte substitution computational stage, and randomizing the active/operational versus open/transparent status of each bypassable latch. Controller 80 may provide sensitivity level inputs to encryption engine 2 (or a target MTD unit or bitmask unit or RNG thereof) to enable encryption engine 2 to randomize the operation of the bypassable latches and (optionally) to modulate the randomization level, based on the sensitivity of the cipher key being used by encryption engine 2 and/or the protected asset(s) currently being encrypted. In various use case scenarios, controller 80 may provide different sensitivity level metrics to encryption engine 2 and decryption engine 4 based on different secret key lifespans, different asset(s) under protection, etc.

Figure 9:
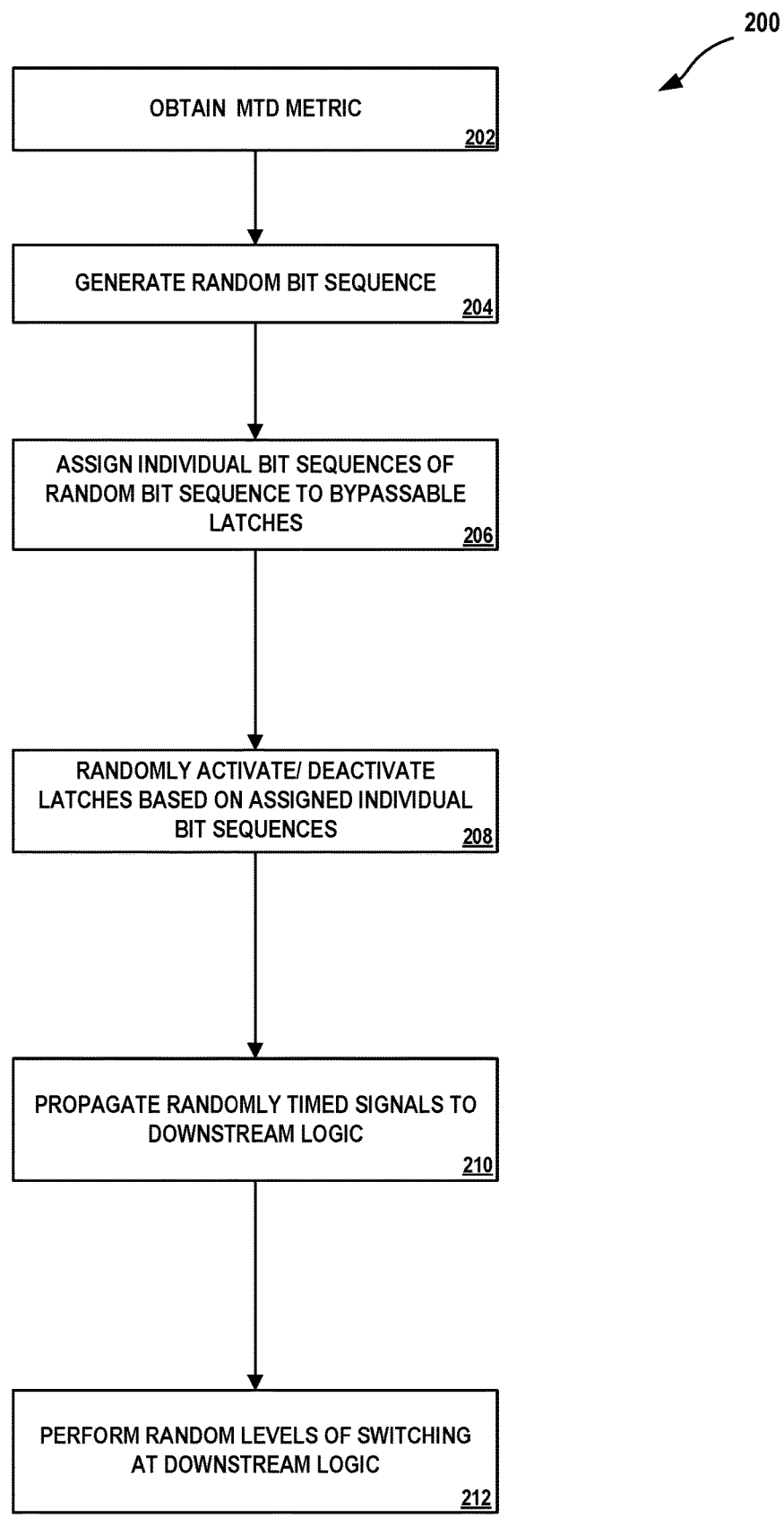
FIG. 9 is a flowchart illustrating an example process that an encryption engine and/or decryption engine of this disclosure may perform to thwart side channel attacks (SCAs) using the glitch-randomizing techniques of this disclosure.

FIG. 9 is a flowchart illustrating an example process 200 that encryption engine 2 and/or decryption engine 4 may perform to thwart SCAs using the glitch-randomizing techniques of this disclosure. Process 200 is described as being performed by decryption engine 4 for ease of discussion, although it will be appreciated that encryption engine 2 may also perform analogous operations in the context of data encryption. Decryption engine 4 may obtain MTD metric 192 (952). Based on MTD metric 192, decryption engine 4 may invoke RNG 196 to generate random bit sequence 198 (204).

In turn, controller 80 may assign individual sequences of random bit sequence 198 to bypassable latches 172-176, and to bypassable latches positioned in the remaining inverse Sbox units of the non-linear computational stage represented by inverse byte substitution computational stage 158 (206). Each individual random bit sequence assigned to a respective bypassable latch of the non-linear computational stage (in this example, inverse byte substitution computational stage 158) corresponds to either an activation sequence or a bypass sequence, the latter of which may represent a default or "catch-all" for individual random bit sequences that do not match a predefined activation sequence.

Based on the individual random bit sequences assigned to the bypassable latches, each of the bypassable latches are randomly activated or deactivated (208). That is, the full array of bypassable latches deployed across the non-linear computational stage are randomly activated or deactivated on a latch-by-latch basis, based on whether or not the respective individual random bit sequence assigned to each bypassable latch corresponds to a predefined activation sequence. In turn, respective bypassable latch pairs of the array of bypassable latches may propagate randomly asymmetric or randomly synchronized signal pairs to downstream logic (210). In turn, the downstream logic may perform random levels of switching to synchronize and process the randomly asymmetric or randomly synchronized pairs received from the respective bypassable latch pair (212). For instance, the downstream logic may perform a high level of switching to synchronize signal pairs with acute asymmetry for processing, or may perform a moderate level of switching to synchronize signal pairs with moderate asymmetry for processing, or may perform a minimal (e.g., low to no) level of switching to synchronize, glitch-suppressed signal pairs for processing.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, fixed function circuitry, programmable circuitry, whether alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted device (HMD) connected to a host computer system, a standalone HMD, a mobile device or computing system, or any other hardware platform capable of providing artificial reality content to one or more viewers.

What is claimed is:

1. An artificial reality system comprising:
a decryption datapath having a plurality of computational stages arranged in a pipeline configured to decrypt an encrypted block of data to form a decrypted block of data, wherein a non-linear computational stage of the plurality of computational stages included in the pipeline of the decryption datapath includes:
multiple asymmetric logical paths, wherein a first signal traverses a first logical path and a second signal traverses a second logical path having a greater number of logical units than the first logical path; and
multiple bypassable latches, each bypassable latch of the multiple bypassable latches being positioned in a respective logical path of the multiple asymmetric logical paths;
a controller configured to assign an individual random bit sequence to each bypassable latch of the multiple bypassable latches to randomly activate or randomly disable each bypassable latch of the multiple bypassable latches; and
a head-mounted device (HMD) configured to output artificial reality content including the decrypted block of data.

2. The artificial reality system of claim 1, wherein the controller is further configured to:
obtain a mean time to disclosure (MTD) metric indicating a sensitivity of a secret key applied by the decryption datapath to the encrypted block of data to form the decrypted block of data;
generate a random bit sequence based on the MTD metric; and
form the individual random bit sequences assigned to the multiple bypassable latches using respective segments of the random bit sequence generated based on the MTD metric.

3. The artificial reality system of claim 2, wherein the controller is further configured to determine, based on the sensitivity of the secret key indicated by the MTD metric, a frequency at which to renew the random bit sequence.

4. The artificial reality system of claim 2, wherein the controller is further configured to:
form a bitmask based on the sensitivity of the secret key indicated by the MTD metric; and
apply the bitmask to the random bit sequence such that at least one individual random bit sequence formed from the random bit sequence that matches the activation sequence such that the individual random bit sequence no longer matches the activation sequence.

5. The artificial reality system of claim 1, wherein bypassable latch pairs formed from the multiple bypassable latches relay signal pairs to a downstream logic gate, wherein the controller is configured to randomly activate a first bypassable latch that is included in a bypassable latch pair of the latch pairs and is included in the first logical path, wherein the controller is configured to randomly activate a second bypassable latch that is included in the bypassable latch pair of the latch pairs and included in the second logical path, and wherein the latch pair is configured to randomly suppress signal path asymmetry in the respective signal pair before the respective signal pair arrives at the downstream logic gate.

6. The artificial reality system of claim 5, wherein the downstream logic gate is a combinatorial logic gate, and wherein the combinatorial logic gate is configured to perform a minimal level of switching with respect to processing the respective signal, based on the latch pair randomly suppressing the signal path asymmetry in the respective signal pair before respective signal pair arrives at the downstream logic gate.

7. The artificial reality system of claim 1, wherein bypassable latch pairs formed from the multiple bypassable latches relay signal pairs to a downstream logic gate, wherein the controller is configured to randomly disable a first bypassable latch that is included in a bypassable latch pair of the latch pairs and is included in the first logical path, wherein the controller is configured to randomly disable a second bypassable latch that is included in the bypassable latch pair of the latch pairs and is included in the second logical path, and wherein the latch pair is configured to randomly insert moderate signal path asymmetry in the respective signal pair before the respective signal pair arrives at the downstream logic gate.

8. The artificial reality system of claim 7, wherein the downstream logic gate is a combinatorial logic gate, and wherein the combinatorial logic gate is configured to perform a moderate level of switching with respect to processing the respective signal, based on the latch pair randomly inserting the moderate signal path asymmetry in the respective signal pair before respective signal pair arrives at the downstream logic gate.

9. The artificial reality system of claim 1, wherein bypassable latch pairs formed from the multiple bypassable latches relay signal pairs to a downstream logic gate, wherein the controller is configured to randomly disable a first bypassable latch that is included in a bypassable latch pair of the latch pairs and is included in the first logical path, wherein the controller is configured to randomly activate a second bypassable latch that is included in the bypassable latch pair of the latch pairs and is included in the second logical path, and wherein the latch pair is configured to randomly insert acute signal path asymmetry in the respective signal pair before the respective signal pair arrives at the downstream logic gate.

10. The artificial reality system of claim 9, wherein the downstream logic gate is a combinatorial logic gate, and wherein the combinatorial logic gate is configured to perform a high level of switching with respect to processing the respective signal, based on the latch pair randomly inserting the acute signal path asymmetry in the respective signal pair before respective signal pair arrives at the downstream logic gate.

11. The artificial reality system of claim 1, further comprising a decryption engine that includes the decryption datapath, wherein the decryption engine is integrated into the HMD.

12. An artificial reality system comprising:
a head-mounted device (HMD) configured to receive a block of input data; and
an encryption datapath having a plurality of computational stages arranged in a pipeline configured to encrypt a block of input data to form an encrypted block of data, wherein a non-linear computational stage of the plurality of computational stages included in the pipeline of the encryption datapath includes:
multiple asymmetric logical paths, wherein a first signal traverses a first logical path and a second signal traverses a second logical path having a greater number of logical units than the first logical path; and
multiple bypassable latches, each bypassable latch of the multiple bypassable latches being positioned in a logical path of the multiple asymmetric logical paths; and
a controller configured to assign an individual random bit sequence to each bypassable latch of the multiple bypassable latches to randomly activate or randomly deactivate each bypassable latch of the multiple bypassable latches.

13. The artificial reality system of claim 12, wherein the controller is further configured to:
obtain a mean time to disclosure (MTD) metric indicating a sensitivity of a secret key applied by the decryption datapath to the encrypted block of data to form the decrypted block of data;
generate a random bit sequence based on the MTD metric; and
form the individual random bit sequences assigned to the multiple bypassable latches using respective segments of the random bit sequence generated based on the MTD metric.

14. The artificial reality system of claim 13, wherein the controller is further configured to determine, based on the sensitivity of the secret key indicated by the MTD metric, a frequency at which to renew the random bit sequence.

15. The artificial reality system of claim 13, wherein the controller is further configured to:
form a bitmask based on the sensitivity of the secret key indicated by the MTD metric; and
apply the bitmask to the random bit sequence such that at least one individual random bit sequence formed from the random bit sequence that matches the activation sequence such that the individual random bit sequence no longer matches the activation sequence.

16. The artificial reality system of claim 12, wherein bypassable latch pairs formed from the multiple bypassable latches relay signal pairs to a downstream logic gate, wherein the controller is configured to randomly activate a first bypassable latch that is included in a bypassable latch pair of the latch pairs and is included in the first logical path, wherein the controller is configured to randomly activate a second bypassable latch that is included in the bypassable latch pair of the latch pairs and included in the second logical path, and wherein the latch pair is configured to randomly suppress signal path asymmetry in the respective signal pair before the respective signal pair arrives at the downstream logic gate.

17. The artificial reality system of claim 16, wherein the downstream logic gate is a combinatorial logic gate, and wherein the combinatorial logic gate is configured to perform a minimal level of switching with respect to processing the respective signal, based on the latch pair randomly suppressing the signal path asymmetry in the respective signal pair before respective signal pair arrives at the downstream logic gate.

18. The artificial reality system of claim 12, wherein bypassable latch pairs formed from the multiple bypassable latches relay signal pairs to a downstream logic gate, wherein the controller is configured to randomly disable a first bypassable latch that is included in a bypassable latch pair of the latch pairs and is included in the first logical path, wherein the controller is configured to randomly disable a second bypassable latch that is included in the bypassable latch pair of the latch pairs and is included in the second logical path, and wherein the latch pair is configured to randomly insert moderate signal path asymmetry in the respective signal pair before the respective signal pair arrives at the downstream logic gate.

19. The artificial reality system of claim 18, wherein the downstream logic gate is a combinatorial logic gate, and wherein the combinatorial logic gate is configured to perform a moderate level of switching with respect to processing the respective signal, based on the latch pair randomly inserting the moderate signal path asymmetry in the respective signal pair before respective signal pair arrives at the downstream logic gate.

20. The artificial reality system of claim 12, wherein bypassable latch pairs formed from the multiple bypassable latches relay signal pairs to a downstream logic gate, wherein the controller is configured to randomly disable a first bypassable latch that is included in a bypassable latch pair of the latch pairs and is included in the first logical path, wherein the controller is configured to randomly activate a second bypassable latch that is included in the bypassable latch pair of the latch pairs and is included in the second logical path, and wherein the latch pair is configured to randomly insert acute signal path asymmetry in the respective signal pair before the respective signal pair arrives at the downstream logic gate.

21. The artificial reality system of claim 20, wherein the downstream logic gate is a combinatorial logic gate, and wherein the combinatorial logic gate is configured to perform a high level of switching with respect to processing the respective signal, based on the latch pair randomly inserting the acute signal path asymmetry in the respective signal pair before respective signal pair arrives at the downstream logic gate.

22. The artificial reality system of claim 12, further comprising an encryption engine that includes the encryption datapath, wherein the encryption engine is integrated into the HMD.

23. A decryption integrated circuit (IC) comprising:
an interface configured to receive an encrypted block of data; and
a decryption datapath having a plurality of computational stages arranged in a pipeline configured to decrypt the encrypted block of data to form a decrypted block of data, wherein a non-linear computational stage of the plurality of computational stages included in the pipeline of the decryption datapath includes:
multiple asymmetric logical paths, wherein a first signal traverses a first logical path and a second signal traverses a second logical path having a greater number of logical units than the first logical path; and
multiple bypassable latches, each bypassable latch of the multiple bypassable latches being positioned in a respective logical path of the multiple asymmetric logical paths; and
a controller configured to assign an individual random bit sequence to each bypassable latch of the multiple bypassable latches to randomly activate or randomly disable each bypassable latch of the multiple bypassable latches.

24. The decryption IC of claim 23, wherein the decryption IC is included in a system on a chip (SoC) configured to support an artificial reality application.

25. An encryption integrated circuit (IC) comprising:
an interface configured to receive a block of input data; and
an encryption datapath having a plurality of computational stages arranged in a pipeline configured to encrypt the block of input data to form an encrypted block of data, wherein a non-linear computational stage of the plurality of computational stages included in the pipeline of the encryption datapath includes:
multiple asymmetric logical paths, wherein a first signal traverses a first logical path and a second signal traverses a second logical path having a greater number of logical units than the first logical path; and
multiple bypassable latches, each bypassable latch of the multiple bypassable latches being positioned in a logical path of the multiple asymmetric logical paths; and
a controller configured to assign an individual random bit sequence to each bypassable latch of the multiple bypassable latches to randomly activate or randomly deactivate each bypassable latch of the multiple bypassable latches.

26. The encryption IC of claim 25, wherein the encryption IC is included in a system on a chip (SoC) configured to support an artificial reality application.

* * * * *